(12) United States Patent
Wiatrowski et al.

(10) Patent No.: US 9,718,525 B1
(45) Date of Patent: Aug. 1, 2017

(54) STEERING POSITION SENSING SYSTEM FOR A MARINE ENGINE

(71) Applicant: BRP US INC., Sturtevant, WI (US)

(72) Inventors: Darrell Wiatrowski, Libertyville, IL (US); Roger Raetzman, Pleasant Prairie, WI (US)

(73) Assignee: BRP US INC., Sturtevant, WI (US)

( * ) Notice: Subject to any disclaimer, the term of this patent is extended or adjusted under 35 U.S.C. 154(b) by 226 days.

(21) Appl. No.: 14/593,355

(22) Filed: Jan. 9, 2015

(51) Int. Cl.
    *B63H 20/06* (2006.01)
    *B63H 20/12* (2006.01)
    *G01D 5/14* (2006.01)
    *G01B 7/00* (2006.01)

(52) U.S. Cl.
CPC ............. *B63H 20/12* (2013.01); *B63H 20/06* (2013.01); *G01B 7/003* (2013.01); *G01D 5/14* (2013.01)

(58) Field of Classification Search
CPC ....... G01D 5/142; G01D 11/245; G01D 5/145
See application file for complete search history.

(56) References Cited

U.S. PATENT DOCUMENTS

| | | | |
|---|---|---|---|
| 5,154,651 A | 10/1992 | Binversie et al. | |
| 5,176,549 A | 1/1993 | Ross | |
| 5,194,025 A | 3/1993 | Blanchard et al. | |
| 6,843,195 B2 * | 1/2005 | Watabe | B63H 20/12 114/144 E |
| 7,736,206 B1 | 6/2010 | McChesney et al. | |
| 8,007,330 B2 * | 8/2011 | Wong | B63H 20/12 440/61 S |
| 8,373,410 B2 | 2/2013 | Frachon | |
| 8,387,589 B2 | 3/2013 | Wong et al. | |
| 8,450,999 B2 * | 5/2013 | Wolschlager | G01D 1/00 324/207.25 |
| 2012/0204776 A1 | 8/2012 | Broughton et al. | |

OTHER PUBLICATIONS

MMT—Moving Magnet Technologies SA; Brochure 2011—Innovation in Electromagnetics; http://web.archive.org/web/20111027083248/http:/www.movingmagnet.com/medias/download/mmt-brochure2011.pdf; 2011; France; retrieved from internet in Feb. 12, 2015.
MMT—Moving Magnet Technologies SA and Melexis—Microelectronic Integrated Systems; Through Shaft 360 Magnetic Rotary Position Sensor; http://web.archive.org/web/20111027082950/http:/www.movingmagnet.com/medias/download/0005056-mmt-melexis-development-note.pdf; retrieved from internet in Feb. 12, 2015.
MMT—Moving Magnet Technologies SA; New Generation of Position Sensors; Jan. 2010; pp. 1-11.

* cited by examiner

*Primary Examiner* — Edwin Swinehart
(74) *Attorney, Agent, or Firm* — BCF LLP

(57) ABSTRACT

A marine engine for propelling a watercraft has a drive unit adapted to be pivotally connected about a steering axis to the watercraft, and a steering position sensing system. The steering position sensing system has a magnet housing operatively connected to the drive unit and having an arcuate portion, a magnet disposed in the magnet housing, a sensor housing adapted to be operatively connected to the watercraft and a sensor disposed in the sensor housing. The magnet housing and the magnet are pivotable about the steering axis with the drive unit and relative to the sensor housing. The arcuate portion of the magnet housing is spaced from the sensor housing. The sensor senses a magnetic field of the magnet to determine an angular position of the drive unit relative to the watercraft. A bracket assembly for mounting an outboard engine to a watercraft is also disclosed.

25 Claims, 13 Drawing Sheets

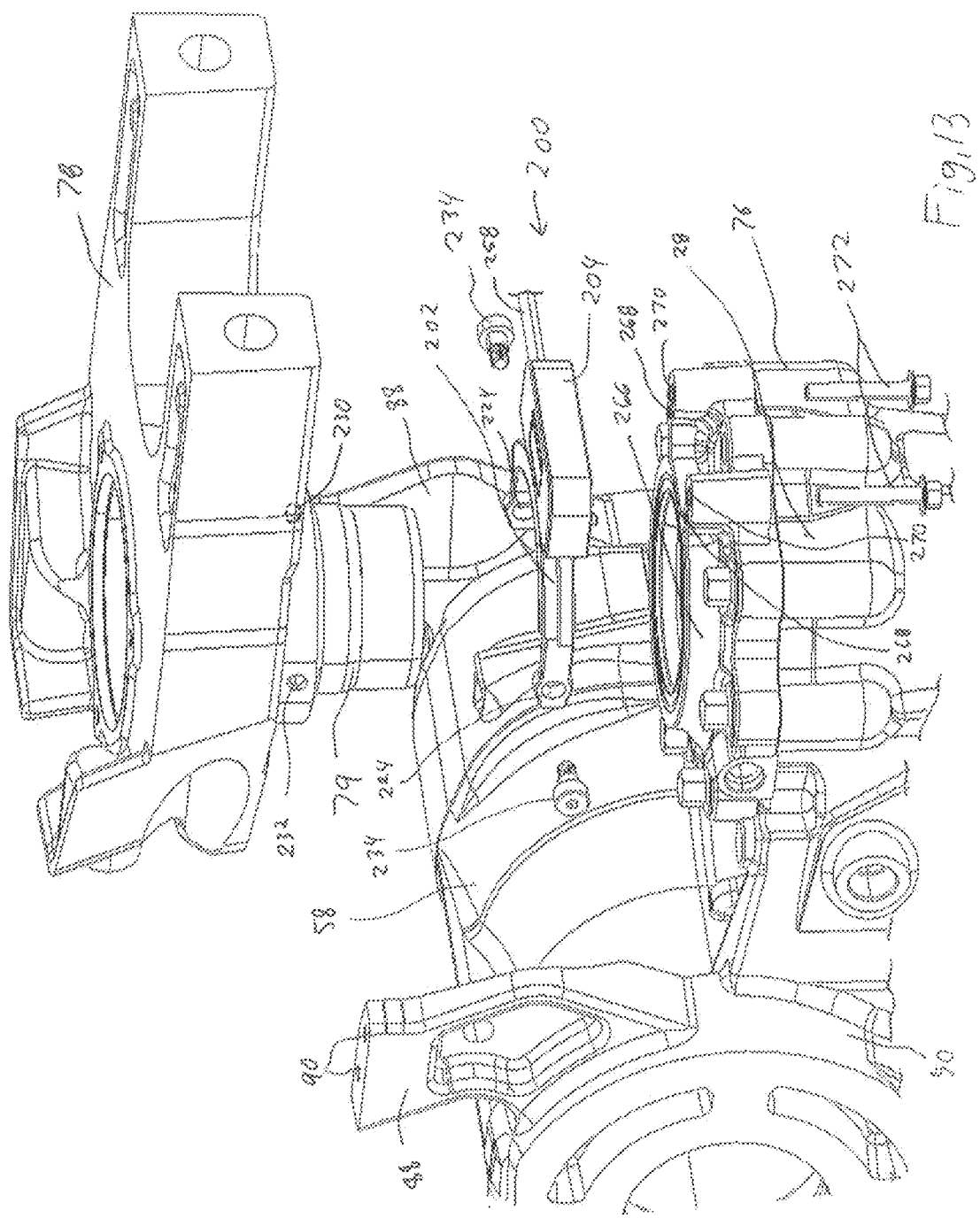

STEERING POSITION SENSING SYSTEM FOR A MARINE ENGINE

FIELD OF THE INVENTION

The present invention relates to steering position sensing systems for marine engines.

BACKGROUND

An outboard engine generally comprises a bracket assembly that connects the drive unit of the marine outboard engine to the transom of a boat. The drive unit includes the internal combustion engine and propeller. The outboard engine is typically designed so that the steering angle and the tilt/trim angles of the drive unit relative to the boat can be adjusted and modified as desired. The bracket assembly typically includes a swivel bracket carrying the drive unit for pivotal movement about a steering axis and a stern bracket supporting the swivel bracket and the drive unit for pivotal movement about a tilt axis extending generally horizontally. The stern bracket is connected to the transom of the boat.

To steer the drive unit, some watercraft propelled by one or more outboard engines use a mechanical steering in which push-pull cables are operatively connected between the steering wheel and the drive unit. In other watercraft, hydraulic lines run from the steering wheel and connect to a hydraulic actuator on the bracket assembly or the transom of the watercraft that is used to steer the drive unit. In both cases, a rotation of the steering wheel is directly translated into a corresponding rotation of the drive unit about the steering axis.

Other watercraft propelled by one or more outboard engines use what is commonly referred to as a steering-by-wire system. In such an embodiment, a steering wheel position sensor senses a position (or a change in position) of the steering wheel and a signal representative of this position is sent to a steering actuator on the bracket assembly or the transom of watercraft. The steering actuator then steers the drive unit based on this signal. In some embodiments, the steering actuator is an electrical actuator. In other embodiments, the steering actuator is a hydraulic actuator and an electrically powered hydraulic pump. In some embodiments, the hydraulic actuator and pump are provided in addition to a system having hydraulic lines running from the steering wheel to a hydraulic actuator to form what is sometimes referred to as a hydraulic power steering system.

In such steering-by-wire systems, the rotation of the steering wheel and the steering of the drive unit are decoupled. It is therefore desirable to obtain some kind of feedback in order to know that the drive unit has actually been steered to a position corresponding to the position of the steering wheel.

Some outboard engines using steering-by-wire systems are therefore provided with steering position sensor sensing an angular position of the drive unit about the steering axis. Most outboard engines are steered by linear actuators (hydraulic or otherwise). In such outboard engine, the steering sensor senses a linear position of a movable part of the linear actuator. The linear position of the movable part of the linear actuator is then converted to a corresponding angular position of the drive unit. However, some outboard engines are now provided with rotary hydraulic actuator, such as described in U.S. Pat. No. 7,736,206 B1, issued Jun. 15, 2010, the entirety of which is incorporated herein by reference.

There is therefore a need for a steering position sensing system adapted for outboard engines using a rotary hydraulic actuator to steer the drive unit.

It would also be desirable to have a steering position sensing system sensing an angular position of the drive unit directly, thus avoiding the conversion from linear position to angular position that is necessary with the above described linear position sensor.

Also, linear steering position sensors typically have a movable part and a fixed part. The movable part slides in and out of the fixed part. The interface between these two parts can lead to water entering the fixed part, which usually contains sensitive electronics. Furthermore, water inside the fixed part can hinder the motion of the movable part. It is possible to provide seals, but these add to cost and complexity of the sensor. Also, water may get past the seals over time as they wear out, thus requiring replacement of the seals or of the entire sensor should the electronics become damaged by the water.

Therefore there is a need for steering position sensing system that addresses the issue of water intrusion in the sensor.

SUMMARY

It is an object of the present invention to ameliorate at least some of the inconveniences present in the prior art.

In one aspect, a marine engine for propelling a watercraft has a drive unit adapted to be pivotally connected to the watercraft, and a steering position sensing system. The drive unit is pivotable about a steering axis. The steering position sensing system has an arcuate magnet, a magnet housing, a sensor housing and a sensor. The magnet housing has an arcuate portion. The magnet is disposed in the magnet housing. The magnet housing is operatively connected to the drive unit. The magnet housing and the magnet are pivotable about the steering axis with the drive unit. The sensor housing is adapted to be operatively connected to the watercraft. The magnet housing and the magnet are pivotable about the steering axis relative to the sensor housing. The sensor housing has a wall defining an arcuate recess. The arcuate portion of the magnet housing is received in part in the arcuate recess of the sensor housing. The arcuate portion of the magnet housing is spaced from the wall. The sensor is disposed in the sensor housing for sensing a magnetic field of the magnet to determine an angular position of the drive unit relative to the watercraft.

In a further aspect, a stem bracket for mounting the outboard engine to the watercraft is provided. A swivel bracket is pivotally connected to the stern bracket about a generally horizontal tilt/trim axis. The drive unit is pivotally connected to the swivel bracket about the steering axis. The steering axis is generally perpendicular to the tilt/trim axis. The sensor housing is connected to the swivel bracket. The sensor senses the magnetic field of the magnet to determine the angular position of the drive unit relative to the swivel bracket.

In an additional aspect, a drive unit mounting bracket pivotally connects the drive unit to the swivel bracket about the steering axis. The magnet housing is connected to the drive unit mounting bracket and is pivotable about the steering axis with the drive unit mounting bracket.

In a further aspect, the steering position sensing system is disposed between the drive unit mounting bracket and the swivel bracket in a direction parallel to the steering axis.

In an additional aspect, the ends of the magnet housing define apertures. Fasteners are inserted in the apertures and fasten the magnet housing to the drive unit mounting bracket.

In a further aspect, the magnet housing has a protrusion received in a recess defined in the drive unit mounting bracket.

In an additional aspect, the drive unit mounting bracket is an upper drive unit mounting bracket. A lower drive unit mounting bracket pivotally connects the drive unit to the swivel bracket about the steering axis.

In a further aspect, a tilt actuator is operatively connected to the stern bracket and the swivel bracket for pivoting the swivel bracket and the drive unit relative to the stern bracket about the tilt/trim axis.

In an additional aspect, a steering actuator is operatively connected to the drive unit and the swivel bracket for pivoting the drive unit relative to the swivel bracket about the steering axis.

In a further aspect, the steering actuator is a rotary actuator.

In an additional aspect, a center of curvature of the magnet, the arcuate portion of the magnet housing and the arcuate recess of the sensor housing corresponds to the steering axis.

In a further aspect, an arc length of the magnet is greater than an arc length of the arcuate recess of the sensor housing.

In an additional aspect, the magnet housing is generally semi-annular in shape.

In a further aspect, an electronic module is electrically connected to the sensor to receive a signal indicative of the angular position of the drive unit relative to the watercraft.

In another aspect, a bracket assembly for mounting an outboard engine to a watercraft has a stern bracket, a swivel bracket pivotally connected to the stern bracket about a generally horizontal tilt/trim axis, a drive unit mounting bracket pivotally connected to the stern bracket about a steering axis, and a steering position sensing system. The steering position system has an arcuate magnet, a magnet housing, a sensor housing, and a sensor. The magnet housing has an arcuate portion. The magnet is disposed in the magnet housing. The magnet housing is connected to one of the drive unit mounting bracket and the swivel bracket. The sensor housing is connected to another one of the drive unit mounting bracket and the swivel bracket. The magnet housing and the magnet are pivotable about the steering axis relative to the sensor housing. The one of the magnet housing and the sensor housing that is connected to the drive unit mounting bracket is pivotable about the steering axis with the drive unit mounting bracket. The arcuate portion of the magnet housing is spaced from the sensor housing. The sensor is disposed in the sensor housing for sensing a magnetic field of the magnet to determine an angular position of the drive unit mounting bracket relative to the swivel bracket.

In an additional aspect, the steering position sensing system is disposed between the drive unit mounting bracket and the swivel bracket in a direction parallel to the steering axis.

In a further aspect, the magnet housing is connected to the drive unit mounting bracket and the sensor housing is connected to the swivel bracket. The magnet housing and the magnet are pivotable about the steering axis with the drive unit mounting bracket.

In a further aspect, the ends of the magnet housing define apertures. Fasteners are inserted in the apertures and fasten the magnet housing to the drive unit mounting bracket.

In an additional aspect, the magnet housing has a protrusion received in a recess defined in the drive unit mounting bracket.

In a further aspect, the drive unit mounting bracket is an upper drive unit mounting bracket. A lower drive unit mounting bracket pivotally connects the drive unit to the swivel bracket about the steering axis.

In an additional aspect, a tilt actuator is operatively connected to the stern bracket and the swivel bracket for pivoting the swivel bracket and the drive unit mounting bracket relative to the stern bracket about the tilt/trim axis. A steering actuator is operatively connected to the drive unit and the swivel bracket for pivoting the drive unit mounting bracket relative to the swivel bracket about the steering axis.

In a further aspect, the steering actuator is a rotary actuator.

In an additional aspect, a center of curvature of the magnet and the arcuate portion of the magnet housing corresponds to the steering axis.

In a further aspect, the sensor housing has a wall defining an arcuate recess. The arcuate portion of the magnet housing is received in part in the arcuate recess of the sensor housing. The arcuate portion of the magnet housing is spaced from the wall. An arc length of the magnet is greater than an arc length of the arcuate recess of the sensor housing.

In an additional aspect, the magnet housing is generally semi-annular in shape.

For purposes of this application, the term related to spatial orientation such as forward, rearward, left, right, vertical, and horizontal are as they would normally be understood by a driver of a boat sitting thereon in a normal driving position with an outboard engine mounted to a transom of the boat.

Embodiments of the present invention each have at least one of the above-mentioned aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 13 is an exploded view of the components of FIG. 12.

DETAILED DESCRIPTION

The present steering position sensing system will be described with respect to an outboard engine having a steering-by-wire system using hydraulic rotary actuators and a bracket assembly having a stern bracket and a swivel bracket. It is contemplated that at least some aspects of the steering position sensing system could be used on other watercraft propulsion systems such as a sterndrive. It is also contemplated that at least some aspects of the steering position sensing system could be used on a bracket assembly that only has a stern bracket. It is also contemplated that at least some aspect of the steering position sensing system could be used on outboard engines steered by other steering systems, some of which have been described above. It is also contemplated that the steering position sensing system could be used to provide an indication of an angular position of the drive unit to a driver of a watercraft, on a gauge for example, instead of or in addition to being used to provide a feedback to a steering input in a steering-by-wire system.

Figure 1:
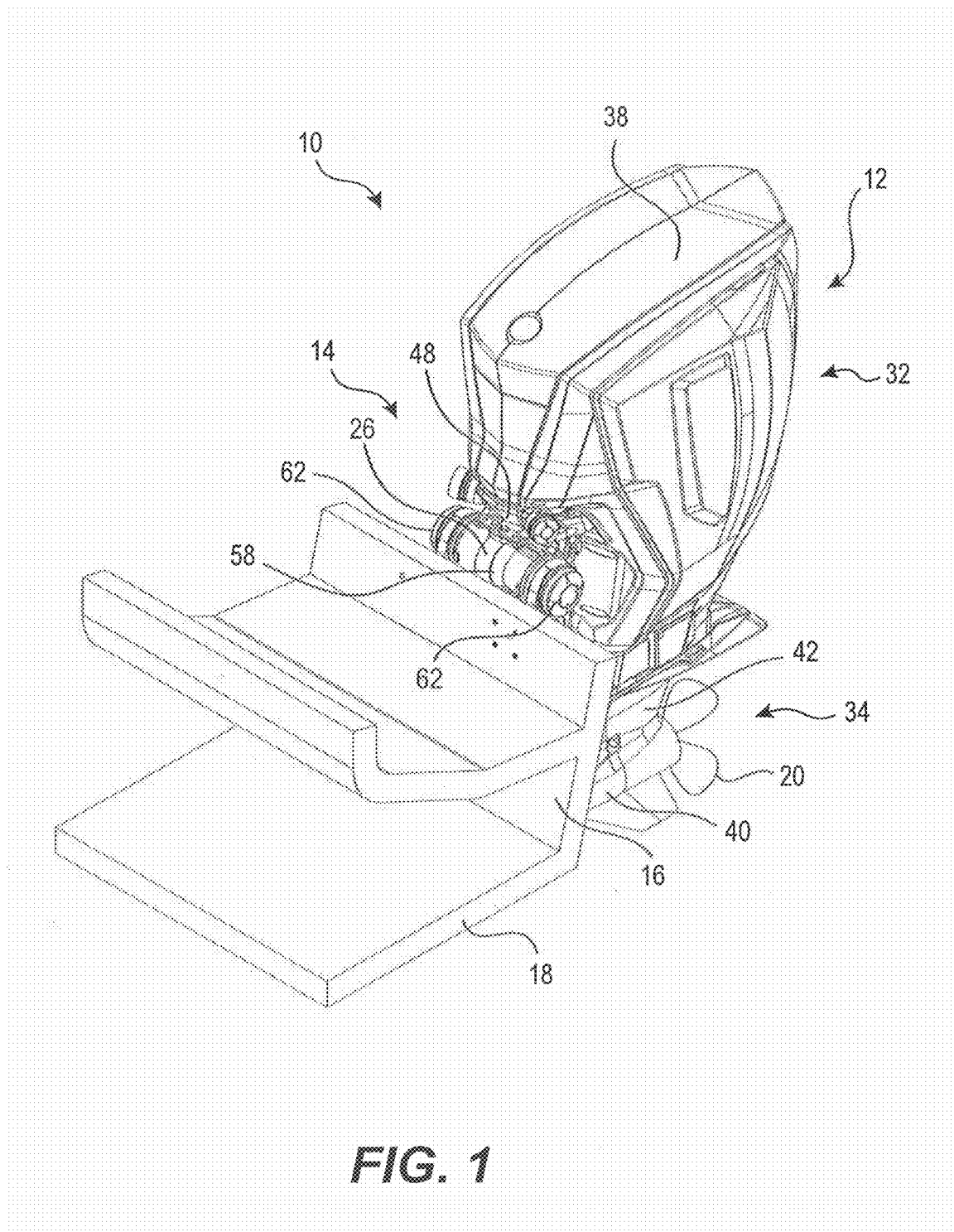
FIG. 1 is a perspective view taken from a front, left side of an outboard engine mounted in an upright position to a transom of watercraft.
Figure 2:
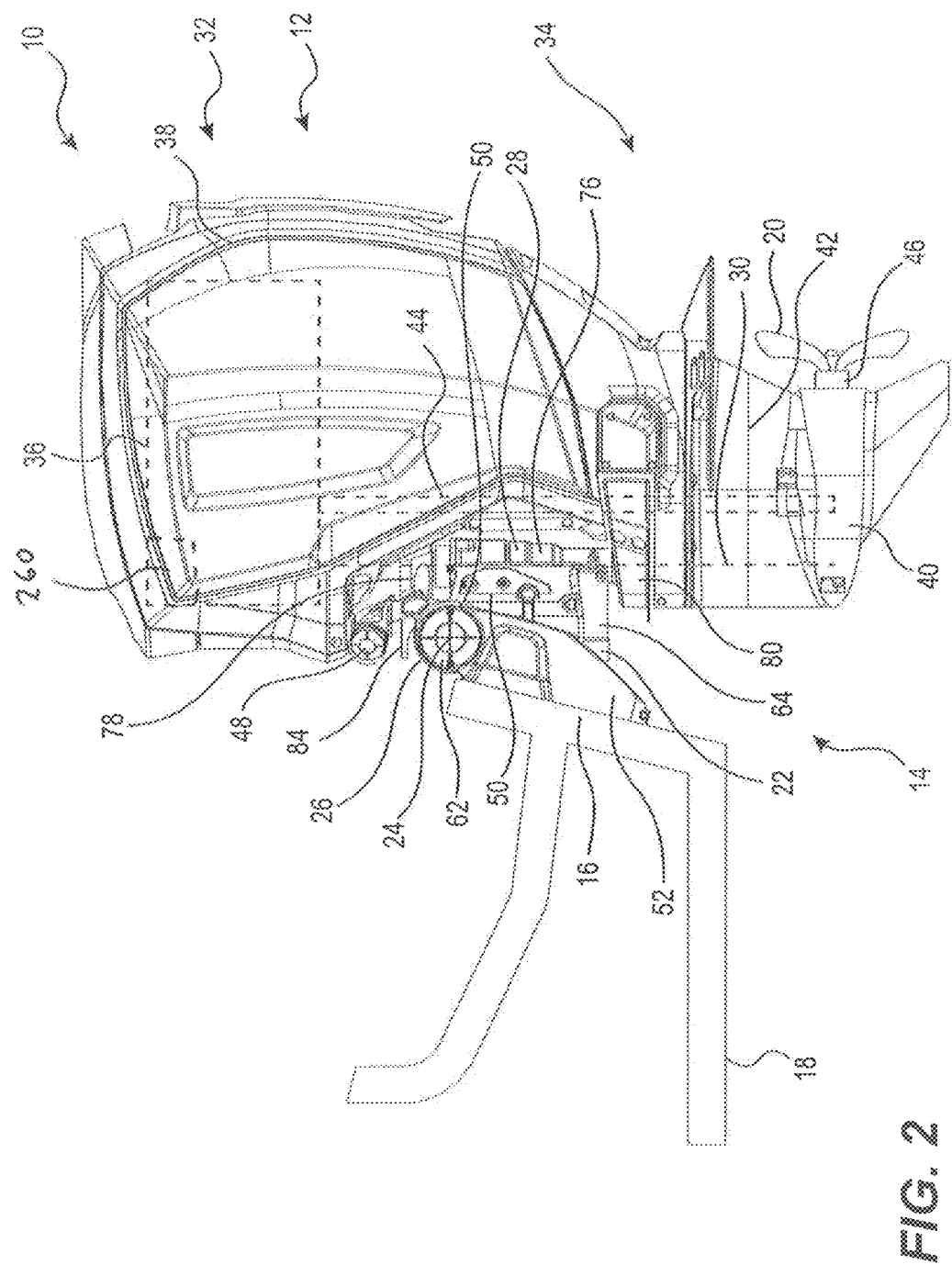
FIG. 2 is a left side elevation view of the outboard engine of FIG. 1.
Figure 3:
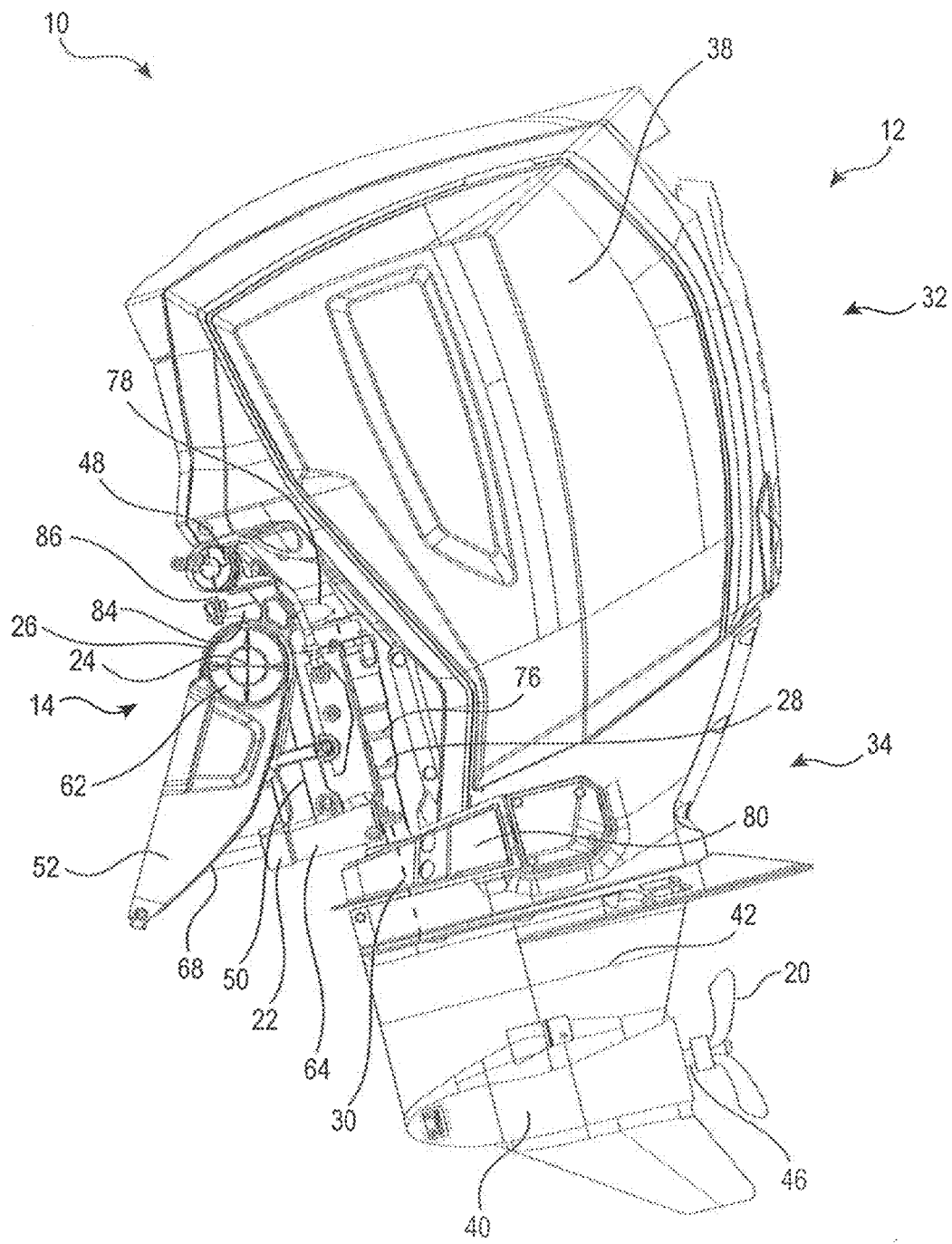
FIG. 3 is a left side elevation view of the outboard engine of FIG. 1 in a trim up position.

With reference to FIGS. 1 to 6, an outboard engine 10, shown in the upright position, includes a drive unit 12 and a bracket assembly 14. The bracket assembly 14 supports the drive unit 12 on a transom 16 of a hull 18 of an associated watercraft (not shown) such that a propeller 20 is in a submerged position with the watercraft resting relative to a surface of a body of water. The drive unit 12 can be trimmed up (see FIG. 3) or down relative to the hull 18 by linear actuators 22 of the bracket assembly 14 about a tilt/trim axis 24 extending generally horizontally. The drive unit 12 can also be tilted up (see FIG. 4) or down relative to the hull 18 by a rotary actuator 26 of the bracket assembly 14 about the tilt/trim axis 24. The drive unit 12 can also be steered to port (see FIG. 6) or to starboard relative to the hull 18 by another rotary actuator 28 of the bracket assembly 14 about a steering axis 30. The steering axis 30 extends generally perpendicularly to the tilt/trim axis 24. When the drive unit 12 is in the upright position as shown in FIGS. 1 and 2, the steering axis 30 extends generally vertically. The actuators 22, 26 and 28 are hydraulic actuators, but other types of actuators are contemplated, such as, but not limited to, electrical actuators. The actuators 22, 26 and 28 and their operation will be discussed in greater detail below.

The drive unit 12 includes an upper portion 32 and a lower portion 34. The upper portion 32 includes an engine 36 (schematically shown in dotted lines in FIG. 2) surrounded and protected by a cowling 38. The engine 36 housed within the cowling 38 is an internal combustion engine, such as a two-stroke or four-stroke engine, having cylinders extending horizontally. It is contemplated that other types of engine could be used and that the cylinders could be oriented differently. The lower portion 34 includes the gear case assembly 40, which includes the propeller 20, and the skeg portion 42, which extends from the upper portion 32 to the gear case assembly 40.

The engine 36 is coupled to a driveshaft 44 (schematically shown in dotted lines in FIG. 2). When the drive unit 12 is in the upright position as shown in FIG. 2, the driveshaft 44 is oriented vertically. It is contemplated that the driveshaft 44 could be oriented differently relative to the engine 34. The driveshaft 44 is coupled to a drive mechanism (not shown), which includes a transmission (not shown) and the propeller 20 mounted on a propeller shaft 46. In FIG. 2, the propeller shaft 46 is perpendicular to the driveshaft 44, however it is contemplated that it could be at other angles. The driveshaft 44 and the drive mechanism transfer the power of the engine 36 to the propeller 20 mounted on the rear side of the gear case assembly 40 of the drive unit 12. It is contemplated that the propulsion system of the outboard engine 10 could alternatively include a jet propulsion device, turbine or other known propelling device. It is further contemplated that the bladed rotor could alternatively be an impeller.

To facilitate the installation of the outboard engine 10 on the watercraft, the outboard engine 10 is provided with a box 48. The box 48 is connected on top of the rotary actuator 26. As a result, the box 48 pivots about the tilt/trim axis 24 when the outboard engine 10 is tilted, but does not pivot about the steering axis 30 when the outboard engine 10 is steered. It is contemplated that the box 48 could be mounted elsewhere on the bracket assembly 14 or on the drive unit 12. Devices located inside the cowling 38 which need to be connected to other devices disposed externally of the outboard engine 10, such as on the deck or hull 18 of the watercraft, are provided with lines which extend inside the box 48. In one embodiment, these lines are installed in and routed to the box 48 by the manufacturer of the outboard engine 10 during manufacturing of the outboard engine 10. Similarly, the corresponding devices disposed externally of the outboard engine 10 are also provided with lines that extend inside the box 48 where they are connected with their corresponding lines from the outboard engine 10. It is contemplated that one or more lines could be connected between one or more devices located inside the cowling 38 to one or more devices located externally of the outboard engine 10 and simply pass through the box 48. In such an embodiment, the box 48 would reduce movement of the one or more lines when the outboard engine 10 is steered, tilted or trimmed. It is contemplated that the box 48 could be omitted.

Other known components of an engine assembly are included within the cowling 38, such as a starter motor, an alternator and the exhaust system. As it is believed that these components would be readily recognized by one of ordinary skill in the art, further explanation and description of these components will not be provided herein.

Figure 7:
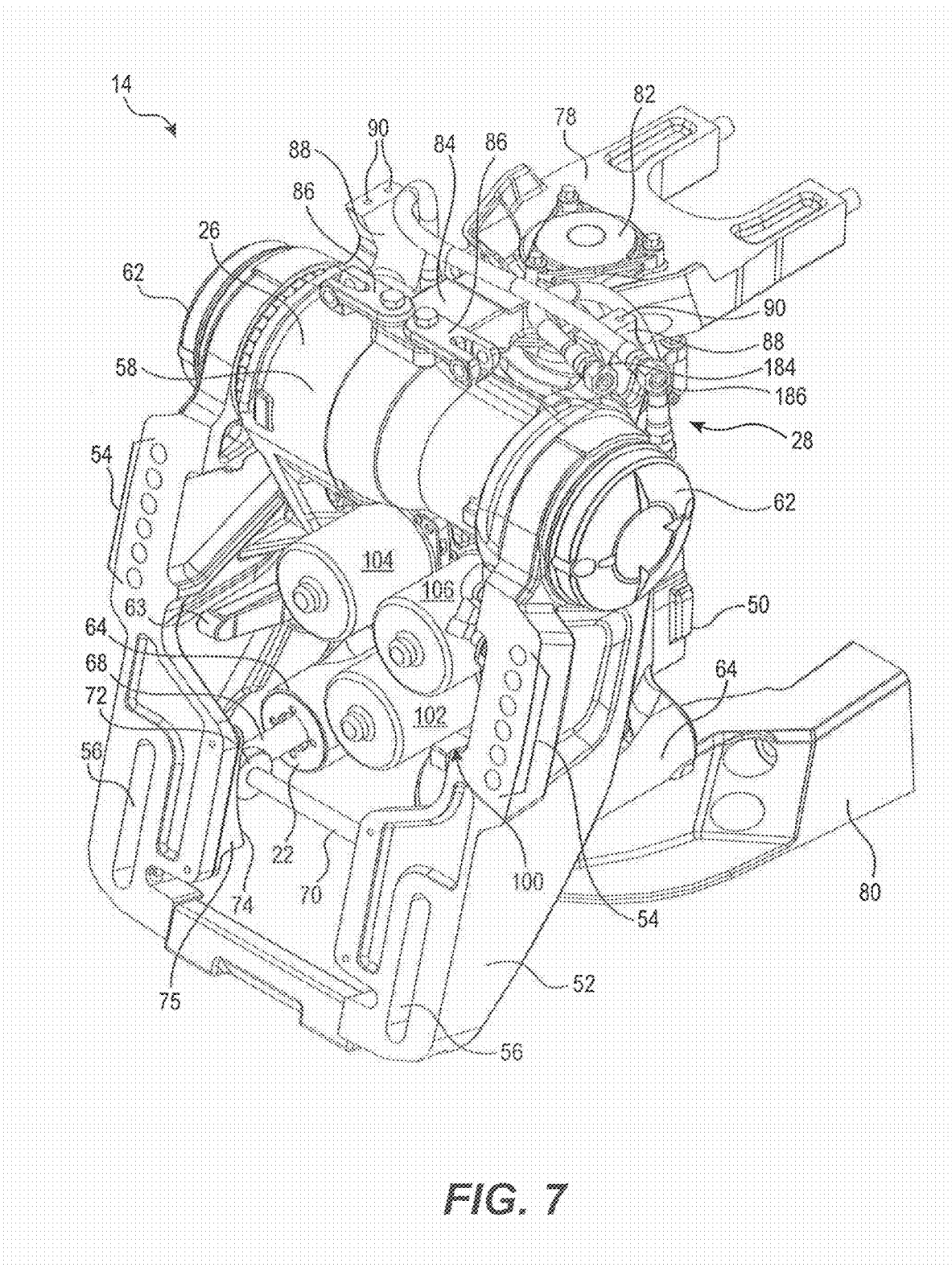
FIG. 7 is a perspective view taken from a front, left side of a bracket assembly of the outboard engine of FIG. 1.

Turning now to FIG. 7, the bracket assembly 14 will be described in more detail. The bracket assembly 14 includes a swivel bracket 50 pivotally connected to a stern bracket 52 via the rotary actuator 26. The stern bracket 52 includes a plurality of holes 54 and slots 56 adapted to receive fasteners (not shown) used to fasten the bracket assembly 14 to the transom 16 of the watercraft. By providing many holes 54 and slots 56, the vertical position of the stern bracket 52, and therefore the bracket assembly 14, relative to the transom 16 can be adjusted.

The rotary actuator 26 includes a cylindrical main body 58, a central shaft (not shown) disposed inside the main body 58 and protruding from the ends thereof, and a piston (not shown) surrounding the central shaft and disposed inside the main body 58. The main body 58 is located at an upper end of the swivel bracket 50 and is integrally formed therewith. It is contemplated that the main body 58 could be fastened, welded, or otherwise connected to the swivel bracket 50. The central shaft is coaxial with the tilt/trim axis 24. Splined disks (not shown) are provided over the portions of the central shaft that protrude from the main body 58. The splined disks are connected to the central shaft so as to be rotationally fixed relative to the central shaft. The stern bracket 52 has splined openings at the upper end thereof that receive the splined disks therein. As a result, the stern bracket 52, the splined disks and the central shaft are all rotationally fixed relative to each other. Anchoring end portions 62 are fastened to the sides of the stern bracket 52 over the splined openings thereof and the ends of the central shaft, thus preventing lateral displacement of the swivel bracket 50 relative to the stern bracket 52.

The piston is engaged to the central shaft via oblique spline teeth on the central shaft and matching splines on the inside diameter of the piston. The piston is slidably engaged to the inside wall of the cylindrical main body 58 via longitudinal splined teeth on the outer diameter of the piston and matching splines on the inside diameter of the main body 58. By applying pressure on the piston, by supplying hydraulic fluid inside the main body 58 on one side of the piston, the piston slides along the central shaft. Since the central shaft is rotationally fixed relative to the stern bracket 52, the oblique spline teeth cause the piston, and therefore the main body 58 (due to the longitudinal spline teeth), to pivot about the central shaft and the tilt/trim axis 24. The connection between the main body 58 and the swivel bracket 50 causes the swivel bracket 50 to pivot about the tilt/trim axis 24 together with the main body 58. Supplying hydraulic fluid to one side of the piston causes the swivel bracket 50 to pivot away from the stern bracket 52 (i.e. tilt up). Supplying hydraulic fluid to the other side of the piston causes the swivel bracket 50 to pivot toward the stern bracket 52 (i.e. tilt down). In the present embodiment, supplying hydraulic fluid to the left side of the piston causes the swivel bracket 50 to tilt up and supplying hydraulic fluid to the ride side of the piston causes the swivel bracket 50 to tilt down.

U.S. Pat. No. 7,736,206 B1, issued Jun. 15, 2010, provides additional details regarding rotary actuators similar in construction to the rotary actuator 26. It is contemplated that the rotary actuator 26 could be replaced by a linear hydraulic actuator connected between the swivel bracket 50 and the stern bracket 52.

To maintain the swivel bracket 50 in a half-tilt position (i.e. a position intermediate the positions shown in FIGS. 2 and 4), which is a position of the swivel bracket 50 typically used when the watercraft is in storage or on a trailer, the bracket assembly 14 is provided with a locking arm 63 pivotally connected to the swivel bracket 50. To use the locking arm 63, the swivel bracket 50 is tilted up slightly past the half-tilt position, the locking arm 63 is pivoted to its locking position, and the swivel bracket 50 is tilted down to the half-tilt position where the locking arm 63 makes contact with the stern bracket 52. The locking arm 63 thus alleviates stress on the rotary actuator 26 and its associated hydraulic components during storage or transport on a trailer.

The linear actuators 22 each include a cylinder 64, a piston (not shown) disposed inside the cylinder 64, and a rod 68 connected to the piston and protruding from the cylinder 64. As can be seen, the cylinders 64 are located at a lower end of the swivel bracket 50. The cylinders 64 are integrally formed with the swivel bracket 50 and the lines which supply them with hydraulic fluid are formed thereby. It is contemplated that the cylinders 64 could alternatively be fastened, welded, or otherwise connected to the swivel bracket 50. The rods 68 extend generally perpendicularly to the tilt/trim axis 24 and to the steering axis 30. It is contemplated that the hydraulic linear actuators 22 could be replaced by other types of linear actuators having a fixed portion connected to the swivel bracket 50 and a movable portion being extendable and retractable linearly relative to the fixed portion.

A shaft 70 with rollers 72 thereon extends from one rod 68 to the other. The rollers 72 are made of stainless steel, but other materials, such as plastics, are contemplated. The ends of the shaft 70 are inserted inside apertures in the end portions of the rods 68. The rollers 72 are press-fit onto the shaft 70. As a result, both rollers 72 and the shaft 70 rotate together. It is contemplated that the rollers 72 could be rotationally fixed to the shaft 70 by other types of connections. For example, the rollers 72 could be welded, fastened or splined onto the shaft 70. In an alternative embodiment, the shaft 70 is rotationally fixed relative to the rods 68 by being welded, fastened or otherwise connected thereto, and the rollers 72 are rotationally mounted onto the shaft 70 with bearings or bushings for example. As can be seen, the rollers 72 are disposed laterally inwardly of the rods 68. In other words, the left roller 72 is disposed to the right of the left rod 68 and the right roller 72 is disposed to the left of the right rod 68. It is contemplated that the rollers 72 could be disposed laterally outwardly of the rods 68. It is also contemplated that the ends of the rods 68 could be forked and that the rollers 72 could be received in the forked ends of the rods 68. Each roller 72 is disposed in proximity to its corresponding rod 68 to reduce lateral movement of the rod 70.

Figure 4:
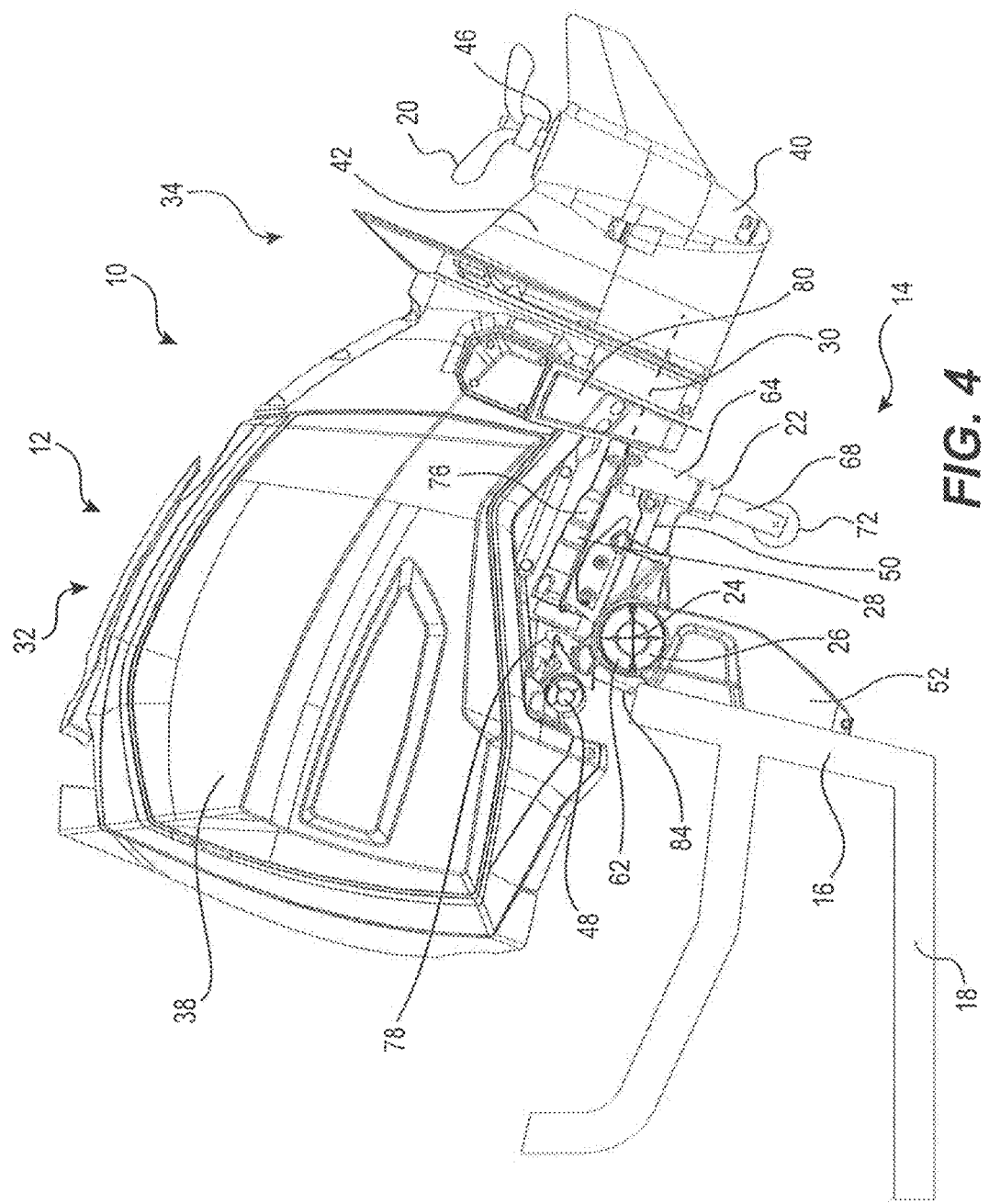
FIG. 4 is a left side elevation view of the outboard engine of FIG. 1 in a tilt up position.
Figure 5:
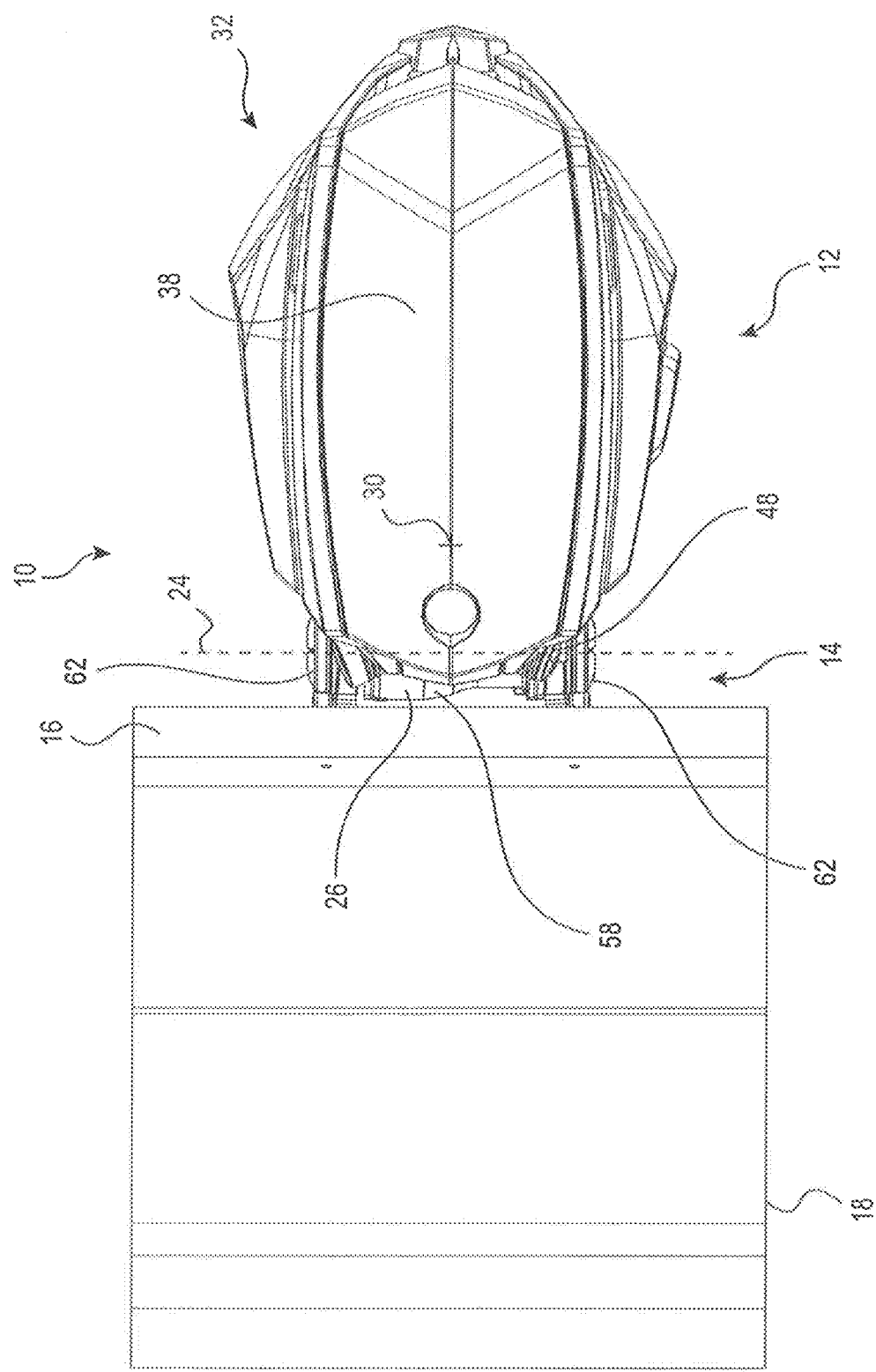
FIG. 5 is a top plan view of the outboard engine of FIG. 1 steered in a straight ahead direction.
Figure 6:
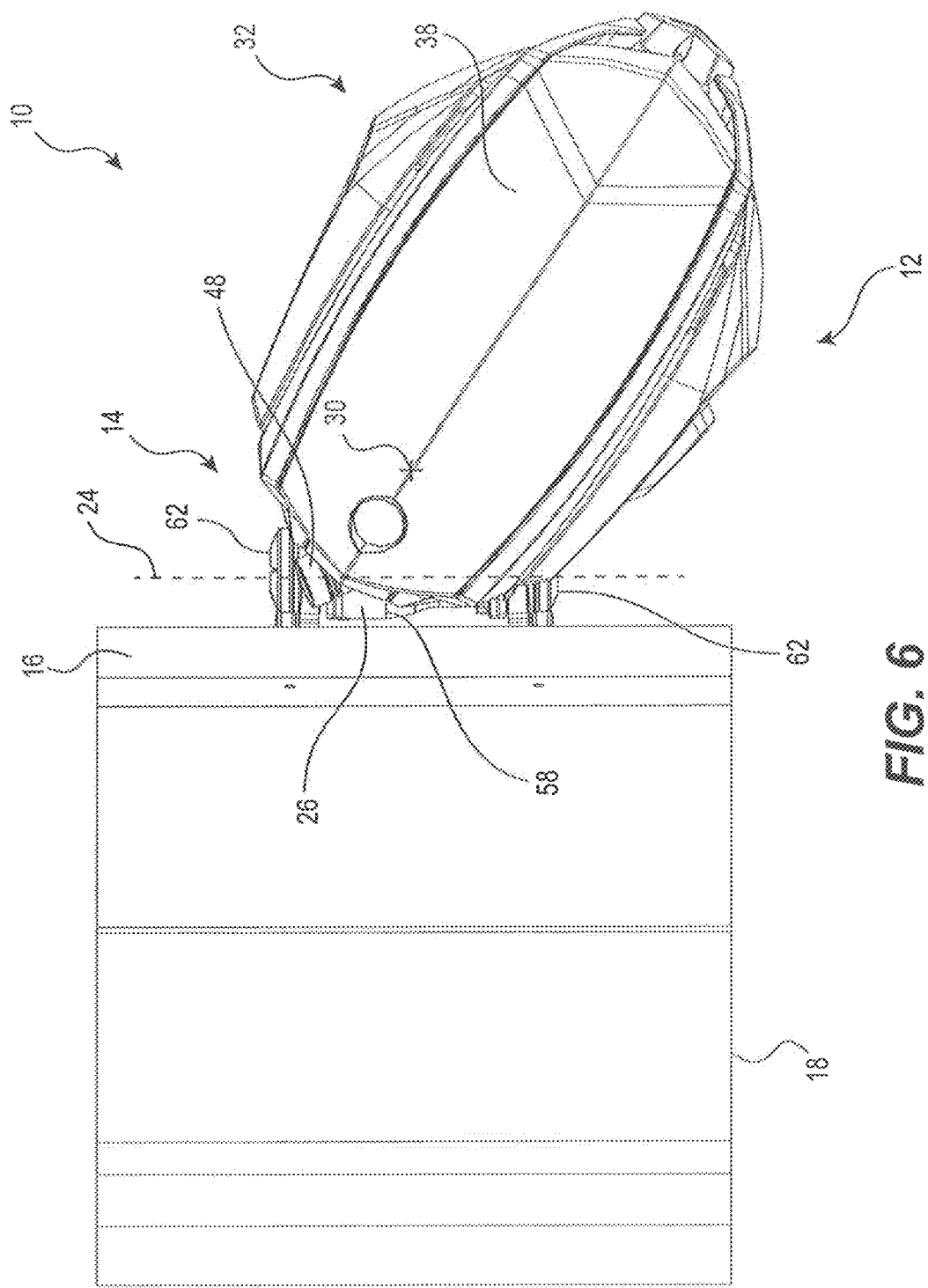
FIG. 6 is a top plan view of the outboard engine of FIG. 1 steered to make turn to port.

By supplying hydraulic fluid inside the cylinders 64 on the side of the pistons opposite the side from which the rods 68 extend, the pistons slide inside the cylinders 64. This causes the rods 68 to extend further from the cylinders 64 and the rollers 72 to roll along and push against the curved surfaces 74 formed by the ramps 75 connected to the stern bracket 52. The shaft 70 helps maintain the rollers 72 in alignment with each other. It is also contemplated that the alignment of the rollers 72 could be maintained in another manner. For example, it is contemplated that the complementary shapes of the pistons and the cylinders 64, or alternatively of the rods 68 and the cylinders 64, could maintain the alignment of the rollers 72. The ramps 75 are fastened to the back of the stern bracket 52. It is contemplated that the ramps 75 could be welded to the stern bracket 52, integrally formed with the stern bracket 52, or otherwise connected to the stern bracket 52. As the rods 68 extend from their respective cylinders 64, the rollers 72 roll down along the curved surfaces 74. As the rollers 72 roll down along the curved surfaces 74, they move away from the stern bracket 52 due to the profile of the surfaces 74. As a result of the rods 68 extending from the cylinders 64 and the rollers 72 rolling along the surfaces 74, the swivel bracket 50 pivots away from the stern bracket 52 (i.e. trims up) about the tilt/trim axis 24 up to the angle shown in FIG. 3 where the rods 68 are fully extended. The profile of the curved surfaces 74 determines the speed at which the swivel bracket 50 pivots about the tilt/trim axis 24 (trim speed) for a given amount of extension of the rods 68. In one embodiment, the profile of the curved surfaces 74 is selected such that the rods 68 remain perpendicular to their corresponding surfaces 74 at the points of contact at all times. This can reduce side loading on the rods 68 during operation. In addition, such a curved surface 74 ensures that the trim speed remains constant for a constant rate of extension of the rods 68. In other words, each inch of travel of the rods 68 results in the same amount of rotation of the swivel bracket 50 pivots about the tilt/trim axis 24 throughout the stroke. In another embodiment, the profile of the curved surfaces 74 is selected such that the trim speed increases as the rods 68 extend for a constant rate of extension of the rods 68, thus providing a smoother transition in angular speed from trim to tilt. In one exemplary embodiment, the curved surfaces 74 each define an arc have a center of curvature disposed generally at a center of a surface of their corresponding pistons facing away from the stern bracket 52. It is contemplated that the curved surfaces 74 could be replaced with straight surfaces angled relative to the surface to which the ramps 75 connect of the stern bracket 52. In one exemplary embodiment, the swivel bracket 50 pivots by 22 degrees from its lowest position (i.e. the upright position shown in FIG. 2) to the highest trim position shown in FIG. 3. It is contemplated that this angle could be between 15 and 30 degrees. Once this angle is reached, should further pivoting of the swivel bracket 50 relative to the stern bracket 52 (i.e. tilt) be desired, the rotary actuator 26 provides the pivoting motion up to the angle shown in FIG. 4. As can be seen in FIG. 4, the rollers 72 no longer make contact with the stern bracket 52. To pivot the swivel bracket 50 back toward the stern bracket 52 (i.e. trim down) about the tilt/trim axis 24 from the position shown in FIG. 3, the hydraulic fluid can be actively removed from the cylinders 64 (i.e. pumped out), or can be pushed out of the cylinders 64 by the pistons due to the weight of the swivel bracket 50 and the drive unit 12 pushing toward the stern bracket 52. The movement achieved by the linear actuators 22 is known as trim as they allow for precise angular adjustment of the swivel bracket 50 relative to the stern bracket 52 at a slower angular speed than that provided by the rotary actuator 26.

Similarly to the rotary actuator 26, the rotary actuator 28 includes a cylindrical main body 76 (FIG. 2), a central shaft (not shown) disposed inside the main body 76 and protruding from the ends thereof and a piston (not shown) surrounding the central shaft and disposed inside the main body 76. The main body 76 is centrally located along the swivel bracket 50 and is integrally formed therewith. It is contemplated that the main body 76 could be fastened, welded, or otherwise connected to the swivel bracket 50. The central shaft is coaxial with the steering axis 30. Splined disks (not shown) are provided over the portions of the central shaft that protrude from the main body 76. The splined disks are connected to the central shaft so as to be rotationally fixed relative to the central shaft. An upper generally U-shaped drive unit mounting bracket 78 has a splined opening therein that receives the upper splined disk therein. Similarly, a lower generally U-shaped drive unit mounting bracket 80 has a splined opening therein that receives the lower splined disk therein. The upper and lower drive unit mounting brackets 78, 80 are fastened to the drive unit 12 so as to support the drive unit 12 onto the bracket assembly 14. As a result, the drive unit 12, the splined disks and the central shaft are all rotationally fixed relative to each other. Anchoring end portions 82 (only the upper one of which is shown) are fastened to the upper and lower drive unit mounting brackets 78, 80 over the splined openings thereof and the ends of the central shaft, thus preventing axial displacement of the drive unit 12 along the steering axis 30.

The piston is engaged to the central shaft via oblique spline teeth on the central shaft and matching splines on the inside diameter of the piston. The piston is slidably engaged to the inside wall of the cylindrical main body 76 via longitudinal splined teeth on the outer diameter of the piston and matching splines on the inside diameter of the main body 76. By applying pressure on the piston, by supplying hydraulic fluid inside the main body 76 on one side of the piston, the piston slides along the central shaft. Since the main body 76 is rotationally fixed relative to the swivel bracket 50, the oblique spline teeth cause the central shaft and therefore the upper and lower drive unit mounting bracket 78, 80, to pivot about the steering axis 30. The connections between the drive unit 12 and the upper and lower drive unit mounting brackets 78, 80 cause the drive unit 12 to pivot about the steering axis 30 together with the central shaft. Supplying hydraulic fluid to one side of the piston causes the drive unit 12 to steer to port. Supplying hydraulic fluid to the other side of the piston causes the drive unit 12 to steer to starboard. In the present embodiment, supplying hydraulic fluid above the piston causes the drive unit 12 to steer to port and supplying hydraulic fluid below the piston causes the drive unit 12 to steer to starboard. A steering position sensing system 200, described in greater detail below, is provided to sense an angular position of the drive unit 12 and the drive unit mounting brackets 78, 80 relative to the swivel bracket 50.

U.S. Pat. No. 7,736,206 B1, issued Jun. 15, 2010, provides additional details regarding rotary actuators similar in construction to the rotary actuator 28. It is contemplated that the rotary actuator 28 could be replaced by a linear hydraulic actuator connected between the swivel bracket 50 and the drive unit 12.

The upper drive unit mounting bracket 78 has a forwardly extending arm 84. Two linkages 86 are pivotally fastened to the top of the arm 84. When more than one outboard engine is provided on the transom 16 of the watercraft, one or both of the linkages 86, depending on the position and number of outboard engines, of the marine outboard engine 10 can be connected to rods which are connected at their other ends to corresponding linkages on the other outboard engines. Accordingly, when the outboard engine 10 is steered, the linkages 86 and rods cause the other outboard engines to be steered together with the outboard engine 10.

Two arms 88 extend from the upper end of the swivel bracket 50. These arms 88 are provided with threaded apertures 90. These apertures 90 are used to fasten the box 48 to the swivel bracket 50 such that the box 48 pivots about the tilt/trim axis 24 together with the swivel bracket 50.

To supply hydraulic fluid to the rotary actuators 26, 28 and the linear actuators 22, the bracket assembly 14 is provided with a hydraulic unit 100. The hydraulic unit 100 is mounted to the swivel bracket 50 so as to pivot together with the swivel bracket 50 about the tilt-trim axis 24. It is contemplated that in some alternative embodiments of the present bracket assembly 14, that the hydraulic unit 100 or some elements thereof could be mounted to the stern bracket 52 or in the watercraft instead.

The hydraulic unit 100 includes three pumps 102, 104, 106, a valve unit (not shown), and a hydraulic fluid reservoir (not shown). The pumps 102, 104, 106 are mounted via fasteners to the valve unit. The valve unit is mounted to the swivel bracket 50 via fasteners (not shown) inserted into apertures provided in the valve unit. The fluid reservoir is disposed on top of the valve unit and is fastened to the valve unit.

When they are mounted to the swivel bracket 50, the pumps 102, 104, 106 are disposed in a triangular arrangement. In this arrangement, the pump 102 is disposed on a lower half of the swivel bracket 50 along a lateral center of the swivel bracket 50.

The pumps 102, 104, 106 are bi-directional electric pumps. Each pump 102, 104, 106 includes a motor (not shown), a shaft (not shown) and a pumping member (not shown). The motor is connected to the shaft which is itself connected to the pumping member. The motor drives the pumping member by causing the shaft to rotate about a pump axis. The direction of the flow of hydraulic fluid from each pump 102, 104, 106 can be changed by changing the direction of rotation of their respective motors. It is contemplated that the pumps 102, 104, 106 could be unidirectional pumps, in which case it is contemplated that a system of valves could be used to vary the direction of the flow. It is also contemplated that other types of pumps could be used, such as, for example, axial flow pumps or reciprocating pumps. The volume of each pump 102, 104, 106 acts as a hydraulic fluid reservoir.

The pump 102 is used to supply hydraulic fluid to the rotary actuator 26 and the linear actuators 22. Therefore, actuation of the pump 102 controls the tilt and trim. It is contemplated that the pump 102 could be replaced with two pumps: one controlling the upward motion (tilt/trim up) and one controlling the downward motion (tilt/trim down). The pump 102 is fluidly connected to the fluid reservoir via the valve unit. The fluid present in the reservoir and the volume of the reservoir account for the variation in volume of hydraulic fluid in the hydraulic circuit to which the pump 102 is connected that is caused by the displacement of the pistons in the linear actuators 22.

The pump 102 is actuated in response to the actuation by the driver of the watercraft of tilt and trim actuators (not shown) in the form of switches, buttons or levers for example. It is contemplated that the pump 102 could also be controlled by a control unit of the outboard engine 10 or of the watercraft to automatically adjust a trim of the drive unit 12 based on various parameters such as watercraft speed, engine speed and engine torque for example.

The pumps 104 and 106 are used to supply hydraulic fluid to the rotary actuator 28. Therefore, actuation of the pumps 104 and 106 control port and starboard steering of the drive unit 12. In the present embodiment, both pumps 104, 106 are used for both left and right steering motion. It is contemplated that only one of the pumps 104, 106 could be used for providing the port steering motion with the other one of the pumps 104, 106 being used for providing the starboard steering motion. It is also contemplated that each one of the pumps 104, 106 could normally be used for providing one steering motion each with the other one of the pumps 104, 106 being used to provide a boost in pressure to steer when needed or to provide the pressure in case of failure of the pump normally being used to steer in a particular direction. It is also contemplated that only one pump could be used to supply the hydraulic pressure to the rotary actuator 28 to steer both left and right.

The pumps 104, 106 are actuated in response to signals received from one or more steering position sensors sensing a position of a steering wheel (or helm assembly) of the watercraft.

In FIG. 7, the bracket assembly 14 is provided with hydraulic lines 184, 186. These hydraulic lines 184, 186 are optional and can be provided to define an alternative embodiment of the outboard engine 10 which is then steered using a hydraulic power steering system. When the hydraulic lines 184, 186 are not provided, as in the embodiment shown in FIGS. 1 to 6, the outboard engine 10 is steered using a steering-by-wire system. The hydraulic lines 184, 186 are connected to openings (not shown) in the sides of the swivel bracket 50. The openings in the swivel bracket 50 for the lines 184, 186 fluidly communicate with the rotary actuator 28. The lines 184, 186 are routed through the box 48 and are fluidly connected to a hydraulic actuator (not shown) driven by the steering wheel of the watercraft. When the driver turns the steering wheel left, the actuator pushes hydraulic fluid in the line 184, which is then supplied to the rotary actuator 28 to cause the drive unit 12 to turn to port. When the driver turns the steering wheel right, the actuator pushes hydraulic fluid in the line 186 which is then supplied to the rotary actuator 28 to cause the drive unit 12 to turn to starboard. The pumps 104, 106 are actuated as indicated above in response to rotation of the steering wheel to supplement the hydraulic pressure supplied by the lines 184, 186. When the optional lines 184, 186 are not being used, as in the embodiment of FIGS. 1 to 6, their respective openings in the swivel bracket 50 are capped.

Figure 8:
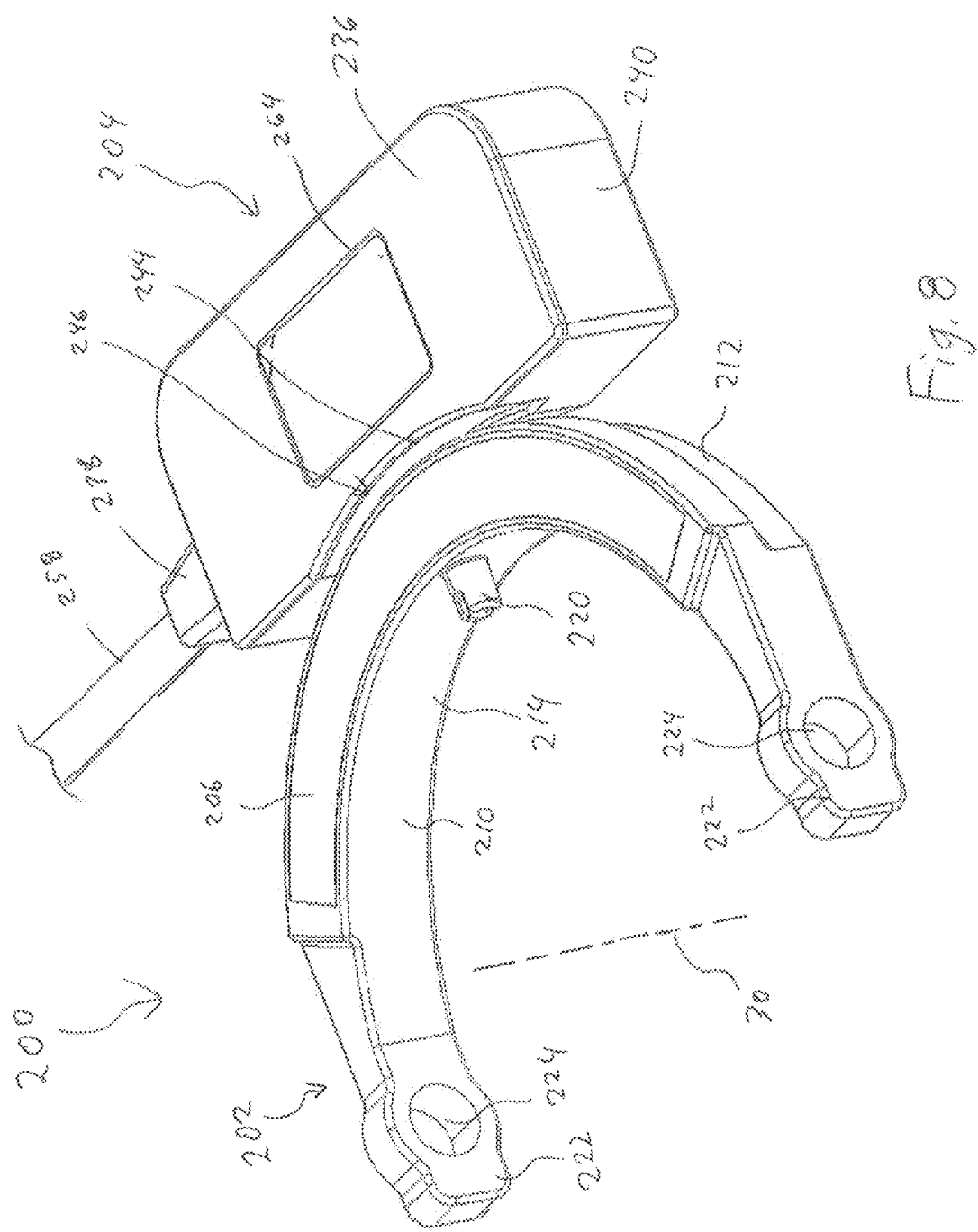
FIG. 8 is a perspective view taken from a front, left side of a steering position sensing system of the outboard engine of FIG. 1 shown in a position corresponding to a drive unit of the outboard engine being steered in a straight ahead direction.
Figure 9:
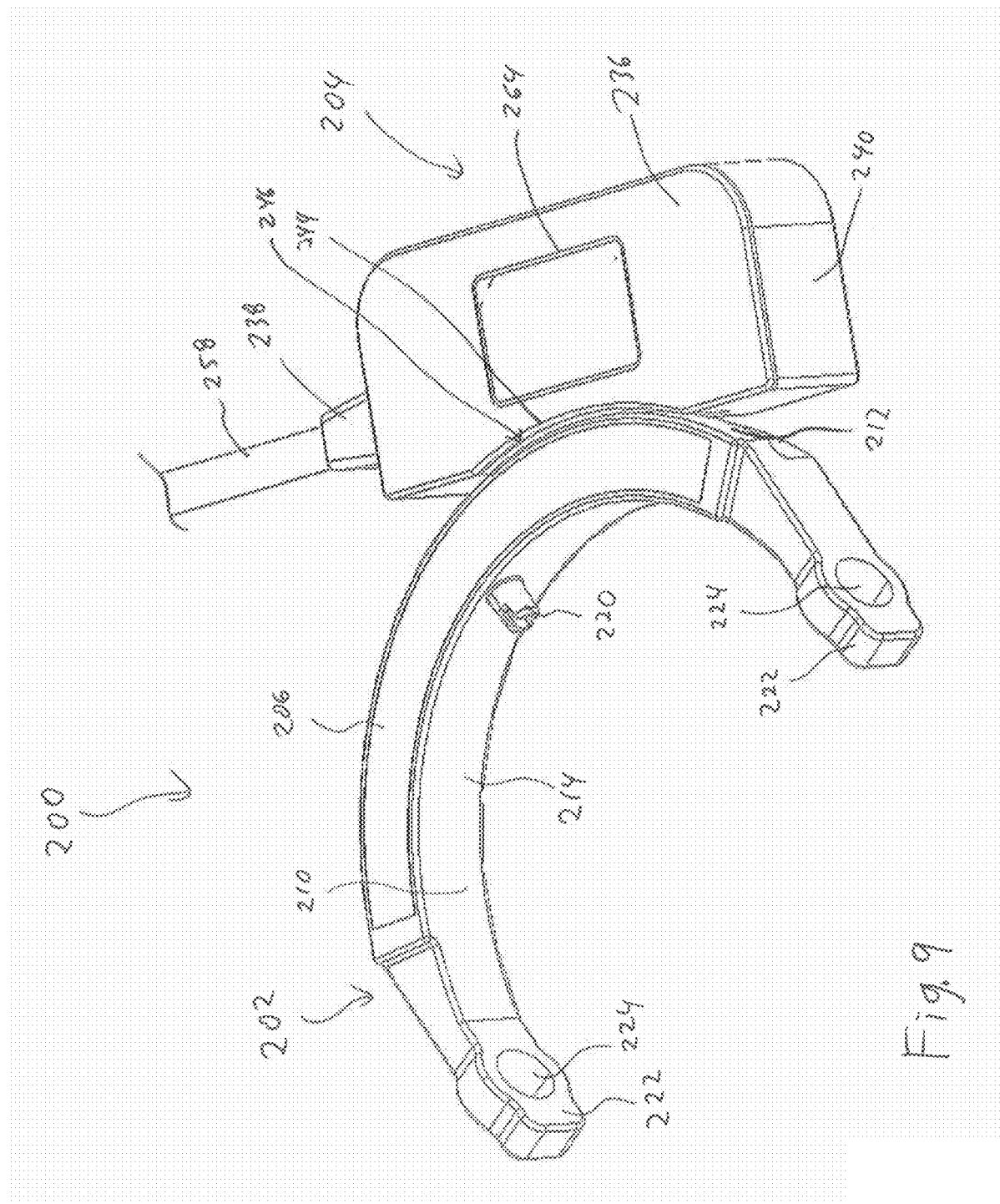
FIG. 9 is a perspective view taken from a front, left side of the steering position sensing system of FIG. 8 shown in a position corresponding to the drive unit being steered to make turn to starboard.
Figure 10:
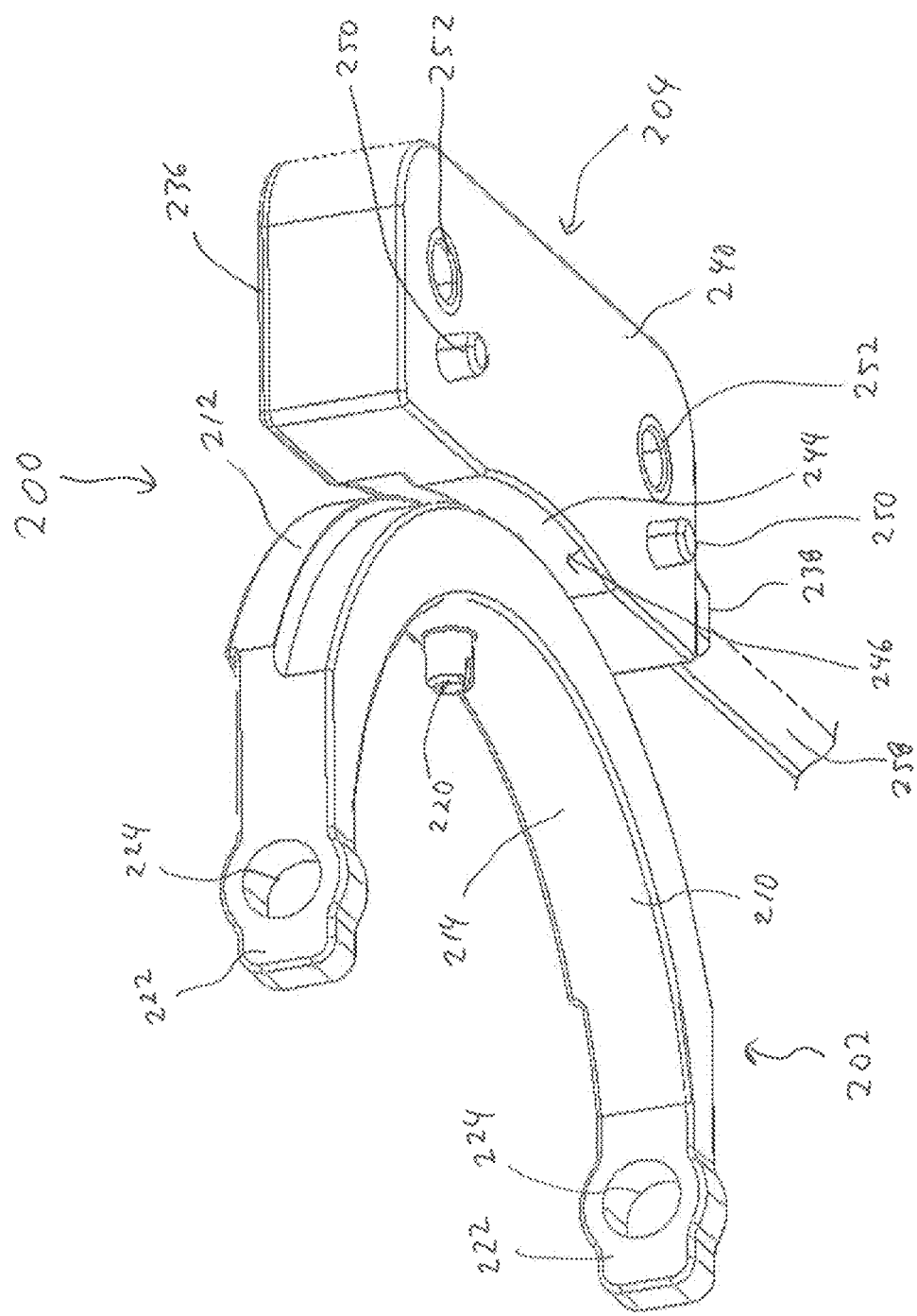
FIG. 10 is a bottom perspective view taken from a front, left side of the steering position sensing system of FIG. 8.

Turning now to FIGS. 8 to 13, the steering position sensing system 200 will be described in more detail. The steering position sensing system 200 includes a magnet assembly 202 and a sensor assembly 204. The two assemblies 202, 204 are completely separate from one another and, as such, are not connected to each other in any way. As best seen in FIGS. 8 to 10 which show the assemblies 202, 204 as they are positioned once mounted to the bracket assembly 14, the two assemblies 202, 204 are spaced apart from each other. As a result, no water can pool between the two assemblies 202, 204 which could otherwise hinder the motion of the magnet assembly 202 relative to the sensor assembly 204.

Figure 11:
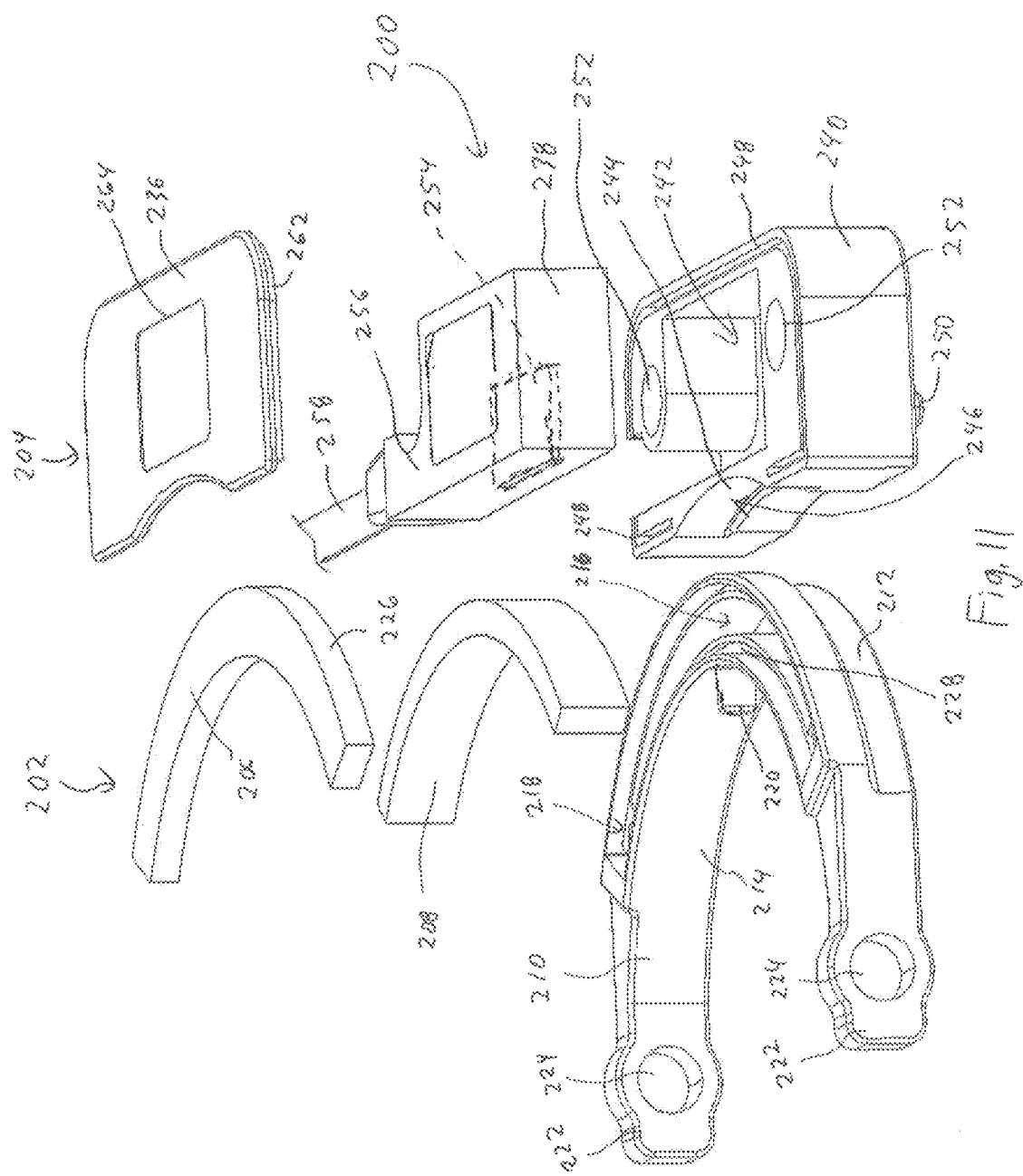
FIG. 11 is an exploded view of the steering position sensing system of FIG. 8.

As best seen in FIG. 11, the magnet assembly 202 has a cover 206, a permanent magnet 208 and a magnet housing 210.

As can be seen, the magnet 208 is arcuate in shape and will therefore be referred to as an arcuate magnet 208. Once installed on the outboard engine 10 as described below, the center of curvature of an arc passing through a middle of the arcuate magnet 208 corresponds to the steering axis 30. In one embodiment, the magnet 208 has multiple north and south poles (not shown) distributed along its arc length. These multiple poles create a magnetic field that enables the sensor assembly 204 to determine the relative angular position of the arcuate magnet 208, as will be discussed further below.

In an alternative embodiment, the arcuate magnet 208 is thickest at its lateral center and becomes thinner toward its ends. The thickness of the arcuate magnet 208 is measured in the direction which is perpendicular to the steering axis 30 once installed on the outboard engine 10. As a result, the magnetic field of the arcuate magnet is strongest at its center and weakens toward its ends. A height of the arcuate magnet 208 (i.e. dimension parallel to the steering axis 30) is constant. It is also contemplated that the arcuate magnet 208 could have a constant thickness, be highest at its center and become smaller toward its ends. It is also contemplated that the arcuate magnet 208 could become both thinner and smaller toward its ends. It is also contemplated that the arcuate magnet 208 could be thickest and/or highest at its ends and become thinner and/or smaller toward its center. It is also contemplated that other dimensions of the arcuate magnet 208 resulting in a change in the strength of the magnetic field over its length could be used.

The magnet housing 210 is generally semi-annular in shape. As such, the magnet housing 210 has an outer arcuate wall 212 and an inner arcuate wall 214. The arcuate wall 212 is stepped for reasons that will be discussed below. It is contemplated that the step could be omitted. Once installed on the outboard engine 10 as described below, the centers of curvature of the arcuate walls 212, 214 correspond to the steering axis 30. It is contemplated that the inner wall 214 could not be arcuate and instead be shaped so as to be complementary in shape to the component to which the magnet housing 210 is connected should it not be arcuate. The magnet housing 210 defines a magnet chamber 216 that is complementary in shape to the arcuate magnet 208 in order to prevent movement of the magnet 208 inside the chamber 216. The magnet housing 210 also defines an arcuate slot 218 above the magnet chamber 216 to receive the cover 206. It is contemplated that only a portion of the outer wall 212 in alignment with the magnet 208 could be arcuate. A generally cylindrical protrusion 220 protrudes from a center of the inner arcuate wall 214. The protrusion 220 is used to locate the magnet assembly 202 on the upper drive unit mounting bracket 78 as discussed below. It is contemplated that the protrusion could be omitted. The ends 222 of the magnet housing 210 define apertures 224 used to fasten the magnet assembly 202 on the upper drive unit mounting bracket 78 as discussed below.

The cover 206 is arcuate in shape so as to be complementary in shape to the slot 218 defined by the magnet housing 210. The cover 206 has a peripheral lip 226. Once the magnet 208 is disposed in the chamber 216 of the magnet housing 210, the cover 206 is inserted in the slot 218 thus enclosing the magnet 208 between the magnet housing 210 and the cover 206. The lip 226 of the cover 206 is received in a groove 228 defined by the magnet housing 210. Once in position, a top of the cover 206 is level with the adjacent portions of the magnet housing 210. The cover 206 is press-fit in the magnet housing 210, but it is contemplated that it could be fastened, clipped, bonded, bolted or otherwise connected to the magnet housing 210. It is also contemplated that liquid material, such as for example epoxy, could be poured in the slot 218 and form the cover 206 once it sets. It is also contemplated that the cover 206 could be omitted. For example, the magnet housing 210 could be molded over the magnet 208, thereby encasing the magnet 208 in the magnet housing 210.

Figure 12:
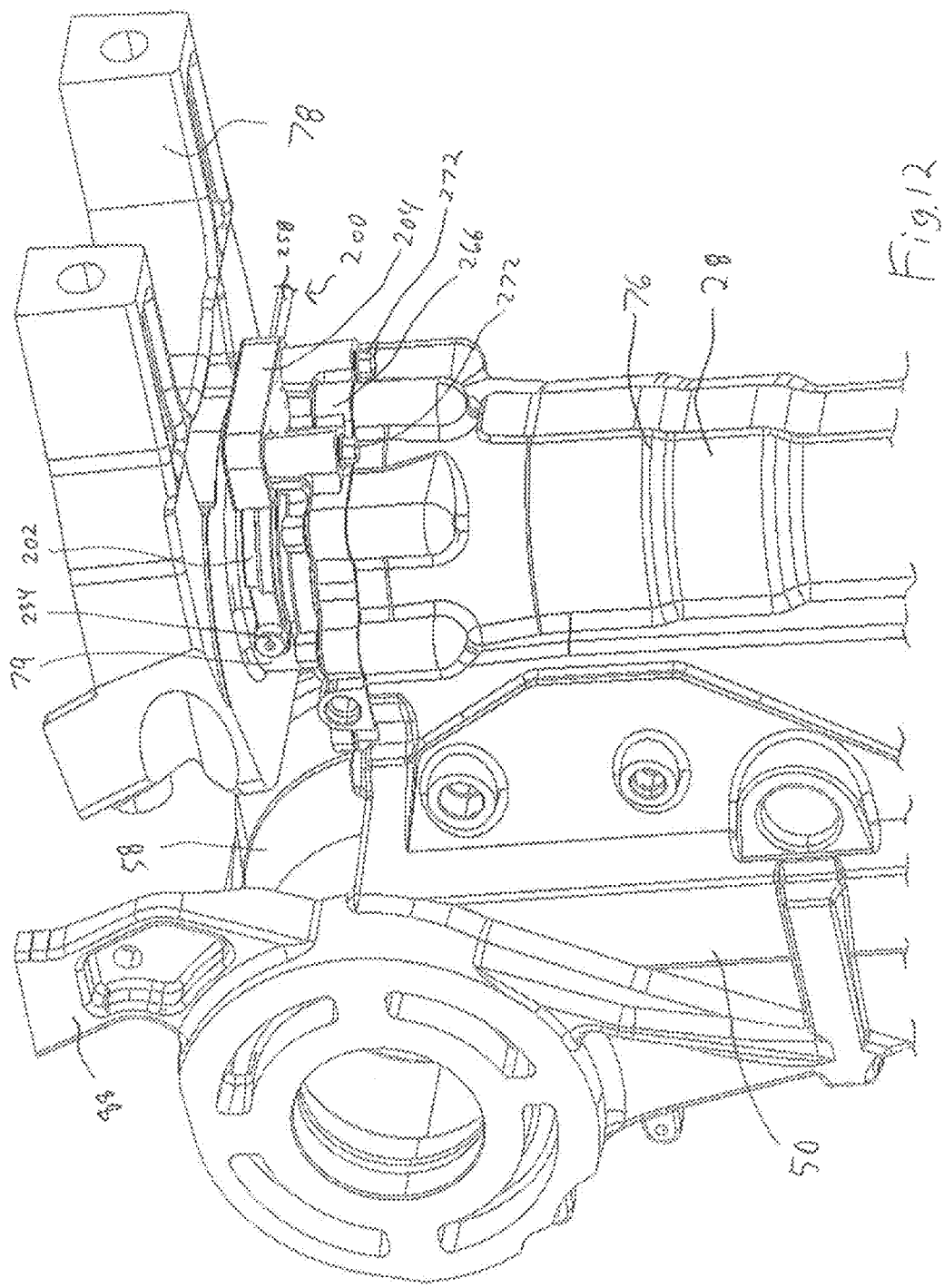
FIG. 12 is a perspective view taken from a rear, left side of an upper portion of a swivel bracket, the steering position sensing system, and an upper drive unit mounting bracket of the outboard engine of FIG. 1.

As can be seen in FIGS. 12 and 13, the magnet assembly 202 is connected to the upper drive unit mounting bracket 78. More specifically, the magnet assembly 202 is mounted to a cylindrical member 79 of the upper drive unit mounting bracket 78 used to connect the upper drive unit mounting bracket 78 to the central shaft of the rotary actuator 28. The cylindrical member 79 has a recess 230 (shown in dotted lines in FIG. 13) defined laterally centrally on a rear of thereof. The cylindrical member 79 also has two threaded apertures 232 (one on each side thereof, only the left one being shown). To connect the magnet assembly 202 to the upper drive unit mounting bracket 78, the protrusion 220 is inserted in the recess 230 thus ensuring proper alignment of the magnet assembly 202 with the upper drive unit mounting bracket 202. It is contemplated that the member 79 could have a protrusion and the magnet housing 210 could have a recess. Other means of providing proper alignment between the magnet assembly 202 and the upper drive unit mounting bracket are contemplated. For example, both the magnet assembly 202 and the upper drive unit mounting bracket 78 could have lines on them that need to be aligned with each other. Threaded fasteners 234 are inserted through the apertures 224 of the magnet housing 210 and fastened in the threaded apertures 232 of the cylindrical member 79. As can be seen in FIG. 12, the magnet assembly 202 extends along a rear side of the cylindrical member and is disposed between the swivel bracket 50 and the upper drive unit mounting bracket 78 in a direction parallel to the steering axis 30.

Returning to FIGS. 8 to 11, the sensor assembly 204 has a cover 236, a sensor module 238, and a sensor housing 240.

The sensor housing 240 defines a sensor chamber 242 to receive the sensor module 238. An outer wall 244 of the sensor housing 240 defines an arcuate recess 246. Once installed on the outboard engine 10 as described below, the center of curvature of the arcuate recess 246 corresponds to the steering axis 30. The outer wall 244 is also stepped so as to be complementary in shape to the outer arcuate wall 212 of the magnet housing 210. The sensor housing 240 has grooves 248 along a periphery on its upper surface. As best seen in FIG. 10, the sensor housing 240 has two protrusion 250 extending from its bottom surface and has two threaded apertures 252 extending through its bottom surface. The protrusions 250 and apertures 252 are used to locate and fasten the sensor assembly 204 on the swivel bracket 50 as will be described in more detail below.

As best seen in FIG. 11, the sensor module 238 has a sensor 254 disposed in a case 256. It is also contemplated that one or more electronic chips and other components could be disposed in the case 256. The sensor 254 is a magnetic field sensor that can sense the strength of a magnetic field and/or variations in magnetic field. One example of such a sensor 254 is a Hall effect sensor, but other types are contemplated. It is contemplated that more than one sensor 254 (which may be of different types) could be disposed in the case 256. For the embodiment comprising an arcuate magnet 208 having a plurality of north and south poles distributed along its arc length described above, the sensor 254 may comprise a pair of Hall effect sensors that can detect the orientation of the magnetic field.

Prior to being disposed in the case 256, the sensor 254 is placed in the sensor chamber 242 of the sensor housing 240 so as to be in proximity to the wall 244 of the sensor housing 240. An electrical wire 258 is electrically connected to the sensor 254. The electrical wire 258, once the sensor assembly is installed on the outboard engine 10, is also electrically connected to an electronic module 260 (FIG. 2) disposed inside the cowling 38 of the drive unit 12 to send a signal from the sensor 254 to the electronic module 260. It is contemplated that the electronic module 260 could be disposed outside the cowling 38, such as on the watercraft for example.

The cover 236 has peripheral lips 262. The cover 236 is disposed on top of the sensor housing 240 to enclose the sensor 254 therebetween. The lips 262 of the cover 236 are inserted in the grooves 248 of the sensor housing 240 and the cover 236 is ultrasonically welded to the sensor housing 240, but it is contemplated that the cover 236 could be fastened, clipped, bonded or otherwise connected to the sensor housing 240.

A liquid material, such as epoxy or another dielectric, is then injected into the sensor chamber 242 between the cover 236 and the sensor housing 240. Once the material sets, it forms the case 256 around the sensor 254. It is contemplated that the case 256 could be molded over the sensor 254 in the shape of the sensor chamber 242 in a separate mold and then be placed into the sensor chamber 242 before the cover 236 is connected to the housing 240. It is also contemplated that the case 256 could be a sealed enclosure inside which the sensor 254 is placed.

It is contemplated that the cover 236 could be omitted. For example, in embodiments where the case 256 is not formed by injecting material in the sensor chamber 242, the sensor housing 240 could be molded over the case 256, thereby encasing the case 256 in the sensor housing 240. The cover 236 defines a rectangular aperture 264 which permits information provided on top of the case 256 to be viewed. It is contemplated that the aperture 264 could be omitted.

As can be seen in FIGS. 12 and 13, the sensor assembly 204 is connected to the swivel bracket 50. More specifically, the sensor assembly 204 is mounted to a collar 266 of the swivel bracket 50. The collar 266 is fastened to the upper end of the cylindrical main body 76 of the rotary actuator 28 and to a portion of the swivel bracket 50 forward of the main body 76. The collar 266 has a pair of recesses 268 (FIG. 13) into which the protrusions 250 of the sensor housing 240 are inserted, thus ensuring proper alignment of the sensor assembly 204 with the magnet assembly 202 during assembly. It is contemplated that the collar 266 could have protrusions and the sensor housing 240 could have recesses. Other means of providing proper alignment between the sensor assembly 204 and the magnet assembly 202 are contemplated. The collar 266 also has two apertures 270 (FIG. 13). Threaded fasteners 272 are inserted through the apertures 270 of the collar 266 and fastened in the threaded apertures 252 of the sensor housing 240 in order to fix the sensor assembly 204 to the collar 266. As can be seen in FIG. 12, the sensor assembly 204 is disposed behind the magnet assembly 202 and is disposed between the swivel bracket 50 and the upper drive unit mounting bracket 78 in a direction parallel to the steering axis 30.

When the magnet assembly 202 and the sensor assembly 204 are mounted to the drive unit mounting bracket 78 and the swivel bracket 50 respectively, the magnet 208 and the sensor 254 are aligned radially with respect to the steering axis 30. More specifically, the magnet 208 is disposed between the steering axis 30 and the sensor 254 in a radial direction. It is contemplated that the sensor 254 and the magnet 208 could alternatively be aligned axially with respect to the steering axis 30. More specifically, the magnet 208 and the sensor 254 could be mounted to the drive unit mounting bracket 78 and the swivel bracket 50 respectively, such that the sensor 254 is either above or below the magnet 208.

The combination of the protrusions 250 and the apertures 252 of the sensor housing 240 and their corresponding features on the collar 266 ensures that the sensor assembly 204 can only be mounted to the collar 266 in one orientation. Similarly the stepped wall 212 of the magnet housing 210, in combination with the stepped wall 244, provides a visual indication as to how the magnet housing 210 should be oriented.

Once the magnet assembly 202 and the sensor assembly 204 are mounted to the bracket assembly 14 as shown in FIG. 12, they are positioned relative to each other as shown in FIGS. 8 to 10. As can be seen, the arcuate wall 212 of the magnet assembly 202 has a portion received in the arcuate recess 246 of the sensor assembly 202. The portion of the arcuate wall 212 that is received in the arcuate recess 246 extends in the space between the wall 244 and a plane defined by the front surfaces of the sensor housing 240 adjacent the recess 246. The walls 212 and 244 are spaced from each other, but are sufficiently close that the sensor 254 can sense the magnetic field of the magnet 208. In an exemplary embodiment, there is a gap of less than 2 mm between the wall 212 and 244 such that the sensor 254 and the magnet 208 are bout 5 mm apart. It is contemplated that the sensor assembly 204 could have walls extending above and below portions of the magnet assembly 202 such that the magnet assembly would be received in a channel.

It is contemplated that the sensor assembly 204 could be connected to the drive unit mounting bracket 78 and the magnet assembly 202 could be mounted to the swivel bracket 50. In such an embodiment, the arcuate recess 246 of the sensor housing 240 would be replaced by an arcuate protrusion that, once the magnet assembly 202 and the sensor assembly 204 are mounted to the bracket assembly 14, would be received in the arcuate recess defined by the inner arcuate wall 214 of the magnet housing 210.

When a signal is received from the steering position sensor of the steering wheel of the watercraft that the drive unit is to be steered, the rotary actuator 28 turns the drive unit mounting brackets 78, 80 and the drive unit 12 by a corresponding amount about the steering axis 30. As the upper drive unit mounting bracket 78 pivots, the magnet assembly 202 pivots with it about the steering axis 30 relative to the sensor assembly 204 as shown in FIG. 9 for example. This pivoting of the magnet assembly 202 causes the magnet 208 to turn about the steering axis 30 relative to the sensor 254. As a result, the magnetic field sensed by the sensor 254 changes. As can be seen in FIG. 11 the arc length of the magnet 208 is greater than the arc length of the arcuate recess 246. The arc length of the magnet 208 is selected to allow the sensor 254 to sense a magnetic field generated by the magnet over the full range of steering positions of the drive unit 12. In one embodiment, the full range of steering positions of the drive unit 12 corresponds to a total range between 60 and 70 degrees (i.e. between 30 and 35 degrees of steering left and between 30 and 35 degrees of steering right). It the present embodiment, the arc length of the magnet 208 is longer than the length necessary to sense a magnetic field generated by the magnet over the full range of steering positions of the drive unit 12. The sensed magnetic field or the sensed variation of the magnetic field, depending on the principles of operation of the sensor 254, is converted to a signal indicative an angular position, or a change in angular position, of the drive unit 12 and brackets 78, 80 relative to the swivel bracket 50. In an exemplary embodiment, two sensors 254 are provided and the sensors 254 and the magnet 208 cooperate to sense the angular position of the drive unit 12 based on the principles described in U.S. Pat. No. 8,373,410 B2, issued Feb. 12, 2013. It is contemplated that other means of determining angular position using a movable magnet and one or more magnetic field sensors could be used.

The signal from the sensor 254 is sent to the electronic module 260 via the electric wire 258. The electronic module 260 compares this signal to the signal originally sent by the steering position sensor of the steering wheel to determine if the drive unit 12 has been steered in the right direction and by the right amount. If not, the electronic module 260 can control the operation of the rotary actuator 28 to obtain the desired angular position. If this is not possible, the electronic module 260 enters a fault mode and takes steps necessary to correct or alleviate the problem. For example, one of the pump 104, 106 could have failed, in which case the electronic module 260 would attempt to make use of only the other pump 104 or 106. Other steps that could be taken by the electronic module 260 include, but are not limited to, reducing and limiting a speed of the engine and causing a fault signal to be presented to a driver of the watercraft. It is contemplated that the position information provided by the sensor assembly 204 could be used by the electronic module 260, or other components of the outboard engine 10, in other ways.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. An outboard engine for propelling a watercraft comprising:
   a drive unit pivotable about a steering axis;
   a stern bracket for mounting the outboard engine to the watercraft;
   a swivel bracket pivotally connected to the stern bracket about a generally horizontal tilt/trim axis, the steering axis being generally perpendicular to the tilt/trim axis;
   a drive unit mounting bracket pivotally connecting the drive unit to the swivel bracket about the steering axis; and
   a steering position sensing system disposed between the drive unit mounting bracket and the swivel bracket in a direction parallel to the steering axis, the steering position sensing system comprising:
   an arcuate magnet;
   a magnet housing having an arcuate portion, the magnet being disposed in the magnet housing, the magnet housing being connected to the drive unit mounting bracket, the magnet housing and the magnet being pivotable about the steering axis with the drive unit mounting bracket;
   a sensor housing connected to the swivel bracket, the magnet housing and the magnet being pivotable about the steering axis relative to the sensor housing, the sensor housing having a wall defining an arcuate recess, the arcuate portion of the magnet housing being received in part in the arcuate recess of the sensor housing, the arcuate portion of the magnet housing being spaced from the wall; and
   a sensor disposed in the sensor housing for sensing a magnetic field of the magnet to determine an angular position of the drive unit relative to the swivel bracket.

2. The outboard engine of claim 1, wherein ends of the magnet housing define apertures; and
   further comprising fasteners inserted in the apertures and fastening the magnet housing to the drive unit mounting bracket.

3. The outboard engine of claim 1, wherein the magnet housing has a protrusion received in a recess defined in the drive unit mounting bracket.

4. The outboard engine of claim 1, wherein the drive unit mounting bracket is an upper drive unit mounting bracket; and
   further comprising a lower drive unit mounting bracket pivotally connecting the drive unit to the swivel bracket about the steering axis.

5. The outboard engine of claim 1, further comprising a tilt actuator operatively connected to the stern bracket and the swivel bracket for pivoting the swivel bracket and the drive unit relative to the stern bracket about the tilt/trim axis.

6. The outboard engine of claim 5, further comprising a steering actuator operatively connected to the drive unit and the swivel bracket for pivoting the drive unit relative to the swivel bracket about the steering axis.

7. The outboard engine of claim 6, wherein the steering actuator is a rotary actuator.

8. The outboard engine of claim 1, wherein a center of curvature of the magnet, the arcuate portion of the magnet housing and the arcuate recess of the sensor housing correspond to the steering axis.

9. The outboard engine of claim 1, wherein an arc length of the magnet is greater than an arc length of the arcuate recess of the sensor housing.

10. The outboard engine of claim 1, wherein the magnet housing is generally semi-annular in shape.

11. The outboard engine of claim 1, further comprising an electronic module electrically connected to the sensor to receive a signal indicative of the angular position of the drive unit relative to the watercraft.

12. The outboard engine of claim 1, wherein:
    the arcuate portion of the magnet housing has an outer arcuate wall and an inner arcuate wall;
    the outer arcuate wall of the magnet housing is received in part in the arcuate recess of the sensor housing; and
    a portion of the drive unit mounting bracket is received in an arcuate recess defined by the inner arcuate wall of the magnet housing.

13. The outboard engine of claim 1, wherein the magnet is disposed between the steering axis and the sensor in a radial direction.

14. A bracket assembly for mounting an outboard engine to a watercraft comprising:
    a stern bracket;
    a swivel bracket pivotally connected to the stern bracket about a generally horizontal tilt/trim axis;
    a drive unit mounting bracket pivotally connected to the swivel about a steering axis; and
    a steering position sensing system disposed between the drive unit mounting bracket and the swivel bracket in a direction parallel to the steering axis, the steering position sensing system comprising:
    an arcuate magnet;
    a magnet housing having an arcuate portion, the magnet being disposed in the magnet housing, the magnet housing being connected to one of the drive unit mounting bracket and the swivel bracket;
    a sensor housing connected to another one of drive unit mounting bracket and the swivel bracket, the magnet housing and the magnet being pivotable about the steering axis relative to the sensor housing, the one of the magnet housing and the sensor housing being connected to the drive unit mounting bracket being pivotable about the steering axis with the drive unit mounting bracket, the arcuate portion of the magnet housing being spaced from the sensor housing; and
    a sensor disposed in the sensor housing for sensing a magnetic field of the magnet to determine an angular position of the drive unit mounting bracket relative to the swivel bracket.

15. The bracket assembly of claim 14, wherein the magnet housing is connected to the drive unit mounting bracket and the sensor housing is connected to the swivel bracket; and
    wherein the magnet housing and the magnet are pivotable about the steering axis with the drive unit mounting bracket.

16. The bracket assembly of claim 14, wherein ends of the magnet housing define apertures; and
    further comprising fasteners inserted in the apertures and fastening the magnet housing to the drive unit mounting bracket.

17. The bracket assembly of claim 14, wherein the magnet housing has a protrusion received in a recess defined in the drive unit mounting bracket.

18. The bracket assembly of claim 14, wherein the drive unit mounting bracket is an upper drive unit mounting bracket; and
further comprising a lower drive unit mounting bracket pivotally connecting the drive unit to the swivel bracket about the steering axis.

19. The bracket assembly of claim 14, further comprising:
a tilt actuator operatively connected to the stern bracket and the swivel bracket for pivoting the swivel bracket and the drive unit mounting bracket relative to the stern bracket about the tilt/trim axis; and
a steering actuator operatively connected to the drive unit and the swivel bracket for pivoting the drive unit mounting bracket relative to the swivel bracket about the steering axis.

20. The bracket assembly of claim 19, wherein the steering actuator is a rotary actuator.

21. The bracket assembly of claim 14, wherein a center of curvature of the magnet and the arcuate portion of the magnet housing correspond to the steering axis.

22. The bracket assembly of claim 14, wherein the sensor housing has a wall defining an arcuate recess, the arcuate portion of the magnet housing is received in part in the arcuate recess of the sensor housing, and the arcuate portion of the magnet housing is spaced from the wall; and
an arc length of the magnet is greater than an arc length of the arcuate recess of the sensor housing.

23. The bracket assembly of claim 22, wherein:
the arcuate portion of the magnet housing has an outer arcuate wall and an inner arcuate wall;
the outer arcuate wall of the magnet housing is received in part in the arcuate recess of the sensor housing; and
a portion of the drive unit mounting bracket is received in an arcuate recess defined by the inner arcuate wall of the magnet housing.

24. The bracket assembly of claim 14, wherein the magnet is disposed between the steering axis and the sensor in a radial direction.

25. A bracket assembly for mounting an outboard engine to a watercraft comprising:
a stern bracket;
a swivel bracket pivotally connected to the stern bracket about a generally horizontal tilt/trim axis;
a drive unit mounting bracket pivotally connected to the swivel about a steering axis; and
a steering position sensing system comprising:
an arcuate magnet;
a magnet housing having an arcuate portion, the magnet being disposed in the magnet housing, the magnet housing being connected to one of the drive unit mounting bracket and the swivel bracket, the magnet housing being generally semi-annular in shape;
a sensor housing connected to another one of drive unit mounting bracket and the swivel bracket, the magnet housing and the magnet being pivotable about the steering axis relative to the sensor housing, the one of the magnet housing and the sensor housing being connected to the drive unit mounting bracket being pivotable about the steering axis with the drive unit mounting bracket, the arcuate portion of the magnet housing being spaced from the sensor housing; and
a sensor disposed in the sensor housing for sensing a magnetic field of the magnet to determine an angular position of the drive unit mounting bracket relative to the swivel bracket.

* * * * *